United States Patent
Yu et al.

(10) Patent No.: US 12,453,737 B2
(45) Date of Patent: Oct. 28, 2025

(54) METHOD FOR HYDRATING LYOPHILIZED CYCLOPHOSPHAMIDE COMPOSITION AND PRODUCT THEREOF

(71) Applicant: Sinotherapeutics Inc., Shanghai (CN)

(72) Inventors: Hongzhen Yu, Shanghai (CN); Ziqiang Li, Shanghai (CN); Jiansheng Wan, Shanghai (CN); Xiaoxi Sheng, Shanghai (CN)

(73) Assignees: Sinotherapeutics Inc., Shanghai (CN); Andorra Pharmaceuticals, LLC, Ocala, FL (US)

( * ) Notice: Subject to any disclaimer, the term of this patent is extended or adjusted under 35 U.S.C. 154(b) by 949 days.

(21) Appl. No.: 17/265,678

(22) PCT Filed: Aug. 5, 2019

(86) PCT No.: PCT/CN2019/099251
§ 371 (c)(1),
(2) Date: Feb. 3, 2021

(87) PCT Pub. No.: WO2020/025069
PCT Pub. Date: Feb. 6, 2020

(65) Prior Publication Data
US 2022/0133754 A1 May 5, 2022

(30) Foreign Application Priority Data

Aug. 3, 2018 (CN) .......................... 201810875707.5
Nov. 16, 2018 (CN) .......................... 201811367499.4

(51) Int. Cl.
*A61K 31/675* (2006.01)
*A61K 9/00* (2006.01)
(Continued)

(52) U.S. Cl.
CPC .......... *A61K 31/675* (2013.01); *A61K 9/0019* (2013.01); *A61K 9/08* (2013.01);
(Continued)

(58) Field of Classification Search
CPC ....... A61K 31/675; A61K 9/0019; A61K 9/08
(Continued)

(56) References Cited

U.S. PATENT DOCUMENTS

| 4,537,883 A | 8/1985 | Alexander et al. |
| 4,659,699 A * | 4/1987 | Francis ................. A61K 31/70 514/53 |

(Continued)

FOREIGN PATENT DOCUMENTS

| CA | 2053065 A1 | 4/1992 |
| CA | 2063058 | 10/1992 |

(Continued)

OTHER PUBLICATIONS

Patel K, Munjal B, Bansal AK. Effect of cyclophosphamide on the solid form of mannitol during lyophilization. European Journal of Pharmaceutical Sciences. Apr. 1, 2017;101:251-7. (Year: 2017).*

(Continued)

*Primary Examiner* — Jeffrey S Lundgren
*Assistant Examiner* — Heather Dahlin
(74) *Attorney, Agent, or Firm* — EVAN LAW GROUP LLC

(57) ABSTRACT

Provided are a hydration method for a lyophilized cyclophosphamide composition and a composition and preparation prepared thereby. The hydration method comprises: (a) providing an aqueous solution comprising cyclophosphamide and an optional pharmaceutically acceptable excipient; (b) freeze-drying the solution to obtain a lyophilized
(Continued)

composition; and (c) hydrating the lyophilized composition by using liquid water to obtain the product.

18 Claims, 4 Drawing Sheets

(51) Int. Cl.
*A61K 9/08* (2006.01)
*A61K 9/19* (2006.01)
*A61K 47/02* (2006.01)
*A61K 47/10* (2017.01)
*A61K 47/26* (2006.01)

(52) U.S. Cl.
CPC .............. *A61K 9/19* (2013.01); *A61K 47/02* (2013.01); *A61K 47/10* (2013.01); *A61K 47/26* (2013.01)

(58) Field of Classification Search
USPC ....................................................... 514/110
See application file for complete search history.

(56) References Cited

U.S. PATENT DOCUMENTS

| | | | |
|---|---|---|---|
| 4,775,533 | A | 10/1988 | Grab |
| 4,797,388 | A | 1/1989 | Francis |
| 5,036,060 | A | 7/1991 | Alam et al. |
| 5,066,647 | A | 11/1991 | Palepu et al. |
| 5,130,305 | A | 7/1992 | Palepu et al. |
| 5,227,374 | A | 7/1993 | Alexander et al. |
| 5,268,368 | A | 12/1993 | Palepu |
| 5,336,669 | A | 8/1994 | Palepu et al. |
| 5,413,995 | A | 5/1995 | Alexander et al. |
| 5,418,223 | A | 5/1995 | Palepu et al. |
| 5,756,552 | A | 5/1998 | Takeuchi et al. |
| 9,662,342 | B2 | 5/2017 | Palepu et al. |
| 10,016,447 | B2 | 7/2018 | Patel et al. |
| 10,149,857 | B2 | 12/2018 | Smith et al. |
| 10,993,952 | B2 | 5/2021 | Chandrashekhar et al. |
| 2004/0105821 | A1 | 6/2004 | Bernstein et al. |
| 2015/0029022 | A1 | 1/2015 | Stebbins |
| 2015/0290226 | A1 | 10/2015 | Chandrashekhar et al. |
| 2015/0320775 | A1 | 11/2015 | Palepu et al. |
| 2017/0014374 | A1 | 1/2017 | Zhang et al. |
| 2018/0055861 | A1 | 3/2018 | Chandrashekhar et al. |
| 2018/0104264 | A1 | 4/2018 | Kang et al. |
| 2018/0256608 | A1 | 9/2018 | Smith et al. |
| 2020/0015557 | A1 | 1/2020 | Shen et al. |
| 2020/0155579 | A1 | 5/2020 | Yu et al. |
| 2022/0133754 | A1 | 5/2022 | Yu |

FOREIGN PATENT DOCUMENTS

| | | |
|---|---|---|
| CA | 2063058 A1 | 10/1992 |
| CA | 2053065 | 10/1998 |
| CN | 1923280 | 3/2007 |
| CN | 1923280 A | 3/2007 |
| CN | 101564413 | 10/2009 |
| CN | 101564413 A | 10/2009 |
| CN | 102058524 | 5/2011 |
| CN | 102058524 A | 5/2011 |
| CN | 102258488 | 11/2011 |
| CN | 102258488 A | 11/2011 |
| CN | 103536546 | 1/2014 |
| CN | 107236004 | 10/2017 |
| CN | 107236004 A | 10/2017 |
| CN | 107540711 | 1/2018 |
| CN | 107540711 A | 1/2018 |
| EP | 0394045 | 10/1990 |
| EP | 0394045 A2 | 10/1990 |
| EP | 1938798 | 7/2008 |
| EP | 1938798 A1 | 7/2008 |
| IN | 0212/MUM/2013 | 10/2014 |
| WO | 1994/08592 | 4/1994 |
| WO | 2014/068585 | 5/2014 |
| WO | 2016/046797 | 3/2016 |
| WO | 2017/207719 | 12/2017 |
| WO | 2017207719 A1 | 12/2017 |
| WO | 2020/025069 | 2/2020 |
| WO | 2020/100088 | 5/2020 |
| WO | 2020100088 A1 | 5/2020 |

OTHER PUBLICATIONS

International Search Report issued Nov. 11, 2019 in International Application No. PCT/CN2019/099251.
Written Opinion issued Nov. 11, 2019 in International Application No. PCT/CN2019/099251.
Beinjnen, et al., "Chemical stability of two sterile, parenteral formulations of cyclophosphamide (Endoxan) after reconstitution and dilution in commonly used infusion fluids," vol. 46(4), pp. 111-116, Jul.-Aug. 1994.
Jan. 27, 2023, U.S. Appl. No. 16/684,038, US.
Jan. 27, 203, U.S. Appl. No. 16/684,038, US.
Jun. 29, 2023, 201980051898.6, CN.
Aug. 10, 2023, U.S. Appl. No. 16/684,038, US.
Dec. 10, 2023, 283170, IL.
Definition of "Joule-Thomson effect", printed from Wikipedia, the free encyclopedia on Apr. 22. 2023, 10 pages, found at http://en.wikipedia.org/wiki/Joule-Thomson_effect.
Product Description of "Cytoxan", Rxlist, found at www.rxlist.com/cytoxan-drug.htm#description, pp. 1-3, (2020), printed on Aug. 9, 2023.
Nov. 11, 2019, PCT/CN2019/099251, WO.
Feb. 19, 2020, PCT/IB2019/059802, WO.
Apr. 16, 2021, U.S. Appl. No. 16/684,038, US.
Jun. 24, 2021, U.S. Appl. No. 16/684,038, US.
Oct. 21, 2021, U.S. Appl. No. 16/684,038, US.
Nov. 12, 2021, U.S. Appl. No. 16/684,038, US.
Jan. 28, 2022, U.S. Appl. No. 16/684,038, US.
Mar. 10, 2022, U.S. Appl. No. 16/684,038, US.
May 11, 2022, 201980051898.6, CN.
Jul. 18, 2022, 202127025861, IN.
Sep. 21, 2022, U.S. Appl. No. 16/684,038, US.
Dec. 9, 2022, 201980051898.6, CN.
U.S. Appl. No. 16/684,038, filed Nov. 14, 2019.
Beijnen et al., "Chemical stability of two sterile, parenteral formulations of cyclophosphamide (Endoxan) after reconstitution and dilution in commonly used infusion fluids," vol. 46(4), pp. 111-116, Jul.-Aug. 1992.
Kim, A.I. et al., "The physical state of mannitol after freeze-drying: effects of mannitol concentration, freezing rate, and a noncrystallizing cosolute", Journal of Pharmaceutical Sciences, vol. 87, No. 8, pp. 931-935, (1998).
"Understanding and interpreting particle size distribution calculations", Horiba Scientific, Technical Note, result interpretation TN156, found at https://static.horiba.com/fileadmin/Horiba/Products/Scientific/Particle_Characterization/Downloads/Technical_Notes/TN156_Understanding_and_Interpreting_PSD_Calculations.pdf, printed on Mar. 13, 2022.
Hiwale, P. et al., "Variables affecting reconstitution time of dry powder for injection", Pharmaceutical Technology, vol. 32, No. 7, pp. 1-8, (2008).
Definition of "Bulk density" printed from Wikipedia, the free encyclopedia on Jun. 13, 2022 found at http://en.wikipedia.org/wiki/Bulk density.
"Particle size result interpretation; number vs. volume distributions", Horiba Scientific, Technical Note, Number vs. Volume Distribution, TN154, pp. 1-2, (2021), found at https://static.horiba.com/fileadmin/Horiba/Products/Scientific/Particle_Characterization/Downloads/Technical_Notes/TN154_Number_v_Volume_Distribution.pdf.
Beijnen, J.H. et al., "Chemical stability of two sterile, parenteral formulations of cyclophosphamide (Endoxan) after reconstitution

(56) References Cited

OTHER PUBLICATIONS and dilution in commonly used infusion fluids", PDA Journal of Pharmaceutical Science and Technology, vol. 46, No. 4, pp. 111-116, (1992). Abstract Only.
Entry for "Cytoxan and Lyophilized Cytoxan", Physicians Desk Reference, 54$^{th}$ Edition, 3 pages, (2000).
International Search Report and Written Opinion dated Feb. 19, 2020 for PCT application No. PCT/IB2019/059802.
International Search Report dated Nov. 11, 2019 for PCT application No. PCT/CN2019/099251.
Extended European Search Report dated Apr. 19, 2022 for EP application No. 19844577.7.

* cited by examiner

METHOD FOR HYDRATING LYOPHILIZED CYCLOPHOSPHAMIDE COMPOSITION AND PRODUCT THEREOF

CROSS-REFERENCE TO RELATED APPLICATIONS

This application is a Section 371 of International Application No. PCT/CN2019/099251 filed Aug. 5, 2019, which was published in the Chinese language Feb. 6, 2020, under International Publication No. WO 2020/025069 A1, which claims priority under 35 U.S.C. § 119(b) to Chinese Patent Application No. 201810875707.5 filed Aug. 3, 2018, and to Chinese Patent Application No. 201811367499.4 filed Nov. 16, 2018, the disclosures of which are incorporated herein by reference in their entireties.

TECHNICAL FIELD

The present invention relates to the pharmaceutical formulation field and particularly relates to a method for hydrating Cyclophosphamide freeze-dried composition and product thereof.

BACKGROUND

In pharmaceutical formulation field, the stability of pharmaceutical active ingredient is important and is generally influenced by various factors, including moisture content. For many pharmaceutical active ingredients and formulations, the moisture content should be controlled within a particular range rather than a value as low as possible. Taking cyclophosphamide (CPP) as an example, it may be present in various hydrated or anhydrous forms. The anhydrate is very unstable at a temperature over 25° C. or at low relative humidity. The anhydrate, however, will absorb water to form a monohydrate at a relative humidity of 20-30% RH or higher. Although monohydrate is a stable form, it will lose crystal water in dry environment (e.g., relative humidity lower than about 20%). Accordingly, the stability is not very good and it is very desirable for the stability of pharmaceutical active ingredient to maintain particular moisture content. Moreover, during commercial production, it is very difficult to keep uniform crystal moisture content of CPP in all of the freeze-drying bottles by controlling freeze-drying process. This results in commercial manufacturing problems.

U.S. Pat. Nos. 4,537,883 and 5,413,995 disclose various CPP freeze-dried products, wherein after freeze-drying of the solution containing CPP and excipient, the freeze-dried composition is hydrated. The hydrating process comprises: 1) after freeze-drying, sterile air and/or nitrogen with relative humidity of 80% is introduced into freeze-drying chamber at normal atmosphere and room temperature to give CPP freeze-dried products with moisture content in a given range; or 2) sterile water vapor is introduced into freeze-drying chamber at reduced pressure and room temperature to give CPP freeze-dried products with moisture content in a given range.

U.S. Pat. No. 4,659,699 discloses a two-step process for preparing CPP freeze-dried products, wherein the hydrating process comprises: sufficient water vapor is sprayed into freeze-drying chamber with nozzle to allow the relative humidity in the freeze-drying chamber above 75%; the water vapor is constantly sprayed for 5 min-2 h to allow the relative humidity in the freeze-drying chamber above about 85% until the freeze-dried composition absorb sufficient water to give CPP freeze-dried products with moisture content in a given range.

SUMMARY

An object of present invention is to provide a method for hydrating Cyclophosphamide freeze-dried composition or a method for preparing a hydrated Cyclophosphamide freeze-dried composition.

In an aspect, provided is a method for hydrating Cyclophosphamide freeze-dried composition, comprising:
(a) providing an aqueous solution comprising Cyclophosphamide and an optional pharmaceutically acceptable excipient;
(b) freeze-drying the aqueous solution to give a freeze-dried composition; and
(c) hydrating the freeze-dried composition with liquid water to give the hydrated Cyclophosphamide freeze-dried composition.

In an embodiment, the Cyclophosphamide in step (a) is in the form of hydrate, anhydrate or mixture thereof, preferably Cyclophosphamide monohydrate.

In another embodiment, based on the weight of freeze-dried composition, the moisture content of the freeze-dried composition obtained in step (b) is no more than about 5%, preferably no more than about 4%, more preferably no more than about 3%, most preferably no more than about 2%.

In an embodiment, the liquid water used in step (c) is in the form of pure water or aqueous solution.

In another embodiment, the aqueous solution in step (c) is preferably the aqueous solution of which the relative humidity value under room temperature is 40-100% RH. The example may be the aqueous solution containing one or more selected from the group consisting of a strong acid, a strong alkali, a glycerol, an inorganic salt and a pharmaceutically acceptable excipient, preferably the aqueous solution containing glycerol or inorganic salt.

In a preferable embodiment, the aqueous solution containing strong acid is the aqueous solution containing sulphuric acid.

In a preferable embodiment, the aqueous solution containing strong alkali is the aqueous solution containing potassium hydroxide or sodium hydroxide.

In a preferable embodiment, the glycerol concentration in the glycerol-containing aqueous solution may be adjusted according to the required relative humidity, and may be 0-100 wt % based on the total weight of aqueous solution. For example, it may be 10 wt %, 20 wt %, 30 wt %, 35 wt %, 40 wt %, 45 wt %, 50 wt %, 55 wt %, 60 wt %, 70 wt %, 80 wt %, 90 wt % or 100 wt %, preferably 20-60 wt %, more preferably 30-50 wt %, especially 35-45 wt %, particularly 40 wt %.

In a preferable embodiment, the aqueous solution containing inorganic salt is the anion-containing aqueous solution of one or more selected from the group consisting of sodium salt, potassium salt, lithium salt, magnesium salt, calcium salt, ammonium salt, cesium salt, cobalt salt and strontium salt, preferably the aqueous solution containing one or more selected from the group consisting of cesium fluoride, lithium bromide, zinc bromide, lithium chloride, calcium bromide, lithium iodide, potassium acetate, potassium fluoride, magnesium chloride, sodium iodide, potassium carbonate, potassium nitrate, sodium bromide, cobalt chloride, potassium iodide, strontium chloride, sodium nitrate, sodium chloride, ammonium chloride, potassium bromide, ammonium sulfate, potassium chloride, strontium nitrate, potassium nitrate, potassium sulfate, potassium chromate, sodium phosphate, sodium dihydrogen phosphate, disodium hydrogen phosphate, potassium phosphate, potassium dihydrogen phosphate, dipotassium hydrogen phosphate, sodium citrate and potassium citrate, more preferably the aqueous solution containing one or more selected from the group consisting of cesium fluoride, lithium bromide, lithium chloride, potassium acetate, magnesium chloride, potassium carbonate, sodium bromide, potassium iodide, sodium chloride, potassium chloride and potassium sulfate. In a preferable embodiment, the inorganic salt concentration in the inorganic salt-containing aqueous solution may be adjusted according to the required relative humidity and may be the concentration of 0-100% saturation. For example, it may be the concentration of 5% saturation, 10% saturation, 20% saturation, 30% saturation, 40% saturation, 50% saturation, 60% saturation, 70% saturation, 80% saturation, 90% saturation or 100% saturation.

In a preferable embodiment, the aqueous solution containing pharmaceutically acceptable excipient is the aqueous solution containing one or more selected from the group consisting of saccharides, organic solvents and surfactants.

In a preferable embodiment of the above aspect, based on the weight of the hydrated Cyclophosphamide freeze-dried composition, the moisture content of the hydrated Cyclophosphamide freeze-dried composition obtained in step (c) is about 2-7%, preferably about 3-6%, more preferably about 3.7-5.5%, especially 3.5-5.5%. In an alternative embodiment, based on the weight of the Cyclophosphamide monohydrate, the moisture content of the hydrated Cyclophosphamide freeze-dried composition obtained in step (c) is about 4-12%, preferably about 5-10%, more preferably about 6-9%.

In another aspect, provided is also a hydrated Cyclophosphamide freeze-dried composition, which is obtained by the hydrating process according to the invention.

In an embodiment, based on the weight of the hydrated composition, the moisture content of the hydrated composition is about 2-7%, preferably about 3-6%, more preferably about 3.7-5.5%, such as about 3.5-5.5%. In an alternative embodiment, based on the weight of the Cyclophosphamide monohydrate, the moisture content of the hydrated Cyclophosphamide freeze-dried composition is about 4-12%, preferably about 5-10%, more preferably about 6-9%.

DETAILED DESCRIPTION

Figure 1:
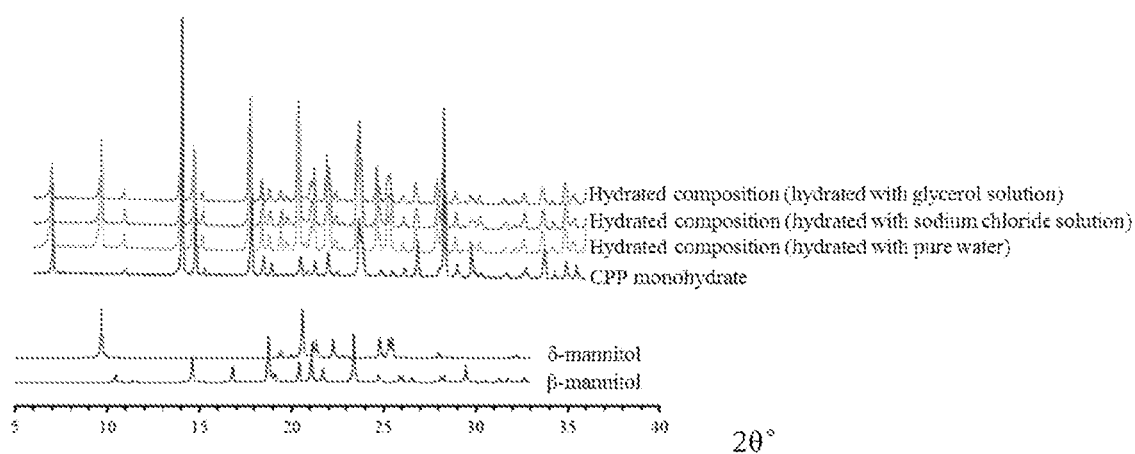
FIG. 1 depicts overlaid XRD patterns of β-mannitol, δ-mannitol, CPP monohydrate, and hydrated CPP freeze-dried compositions prepared according to an embodiment of the present invention.

The invention will be described in the following part and it will be appreciated that the description is provided for illustration to the invention only rather than limitation thereto.

Definition

Unless otherwise defined, the technical and scientific terms used herein have the same meanings as those commonly understood by one skilled in the art. In case of any contradiction, the definitions provided by the present application shall prevail. When an amount, concentration, or other value or parameter is expressed in the form of a range, a preferred range, or a preferred numerical upper limit or a preferred numerical lower limit, it should be understood that it equals to specifically disclosing any range as formed by combining any upper limit of a range or preferred value with any lower limit of a range or preferred value, regardless of whether the said range is specifically disclosed. Unless otherwise indicated, the numerical range listed herein encompasses the end points of the range and all integers and fractions (decimals) within that range.

Though various measurements may be taken using machines or procedures described herein, it should be noted that the measurements are not to be limited to only those machines used or procedures described. It is contemplated that other machines or procedures may be used to produce measurements.

When used with a numerical variable, the term "approximate" or "about" usually refers to the value of the variable and all the values of the variable within the experimental error (for example, within an average 95% confidence interval) or within ±10% of the specified value, or a wider range.

The term "optional" or "optionally" means the event described subsequent thereto may or may not happen. This term encompasses the cases that the event may or may not happen.

The expression "comprise" or its synonyms "contain", "include", "have" or the like is open-ended, which does not exclude other unlisted elements, steps or ingredients. The expression "consist of" excludes any unlisted elements, steps or ingredients. The expression "substantially consist of" refers to specified elements, steps or ingredients within a given range, together with optional elements, steps or components which do not substantively affect the basic and novel feature of the claimed subject matter. It should be understood that the expression "comprise" encompasses the expressions "substantially consist of" and "consist of".

Unless otherwise indicated, the ranges described herein, such as the expression with both upper and lower limits of a range (such as 3.5-5.5%) or just upper or lower limit of a range (such as more than 96% or less than 36.0 μm), or the expression "at least" or "at most" (such as at least 95%), all encompass the values of the listed end points.

The term "one or more" or "at least one" refers to one, two, three, four, five, six, seven, eight, nine or more.

The term "pharmaceutical active ingredient", "active ingredient", "therapeutical agent" or "active agent" refers to a chemical entity which is effectively used for treating or preventing target disease or disorder. There is no particular limitation to the pharmaceutical active ingredient used in the present invention. However, the active agent in freeze-dried product with relatively strict requirement for moisture content range is particularly suitable. In an embodiment, the pharmaceutical active ingredient is Cyclophosphamide.

Cyclophosphamide is a bifunctional nitrogen mustard alkylating agent as non-specific cell cycle medicine. It can interfere with DNA and RNA function and is clinically used to treat malignant lymphoma, multiple myeloma, leukemia, breast cancer, ovarian cancer, cervical cancer, prostate cancer, colon cancer, bronchogenic carcinoma, lung cancer or the like, and can also be used to treat rheumatoid arthritis, childhood nephrotic syndrome and autoimmune disease. Accordingly, the composition, formulation of the present invention or products obtained according to the present method can also be used in these applications. CPP is white crystal or powder with crystallinity and is soluble in water, normal saline or ethanol. It has the chemical name of P—[N,N-bis(β-chloroethyl)]-1-oxa-3-aza-2-phosphocyclohexane-P-oxide and structural formula as formula (I).

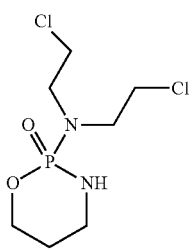

(I)

The nitrogen mustard compounds are not stable in aqueous solution and are prone to degradation. Therefore, the commercially available or developing CPP products are mainly sterile injectable powder prepared by freeze-drying process.

The term "Cyclophosphamide monohydrate" refers to Cyclophosphamide in form of monohydrate with molecular formula of $C_7H_{15}C_{12}N_2O_2P \cdot H_2O$. The moisture content in CPP monohydrate can be determined for example by Karl-Fischer direct titrimetric method described in USP 40-NF 35 Method I <921>. The term "Cyclophosphamide anhydrate" refers to CPP inform of anhydrate with molecular formula of $C_7H_{15}C_{12}N_2O_2P$. In an embodiment of the invention, the Cyclophosphamide used may be in the form of hydrate (e.g. monohydrate), anhydrate or mixture thereof, preferably monohydrate.

Without being bound by theory, the term "cyclophosphamide impurity A," as used herein, and according to the United States Pharmacopeia, refers to the particular cyclophosphamide related compound or related chemical species with the chemical name of Bis(2-chloroethyl)amine hydrochloride, and structure formula as formula (II):

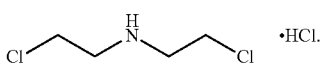

(II)

Without being bound by theory, the term "cyclophosphamide impurity B," as used herein, and according to the United States Pharmacopeia, refers to the particular cyclophosphamide related compound or related chemical species with the chemical name of 3-(2-Chloroethyl)-2-oxo-2-hydroxy-1,3,6,2-oxadiazaphosphonane, or alternatively, 3-(2-Chloroethyl)octahydro-2-hydroxy-1,3,6,2-oxadiazaphosphonine 2-oxide, and structural formula as formula (III):

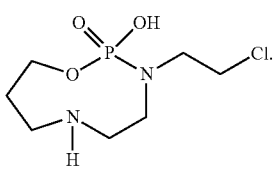

(III)

Without being bound by theory, the term "cyclophosphamide impurity D," as used herein, and according to the United States Pharmacopeia, refers to the particular cyclophosphamide related compound or related chemical species with the chemical name of 3-[[2-[(2-Chloroethyl)amino]ethyl]amino]propyl Monophosphate Dihydrochloride, and structural formula as formula (IV):

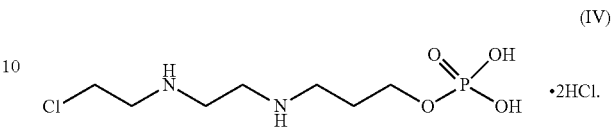

(IV)

The impurity content can be measured by conventional means in the art, such as measured by HPLC.

The term "freeze-dried pharmaceutical composition" or "freeze-dried composition" refers to the composition in freeze-dried form which is obtained by freeze-drying of aqueous solution containing pharmaceutical active agent and an optional pharmaceutically acceptable excipient. When the active agent used is Cyclophosphamide, the freeze-dried composition is also referred to as "freeze-dried Cyclophosphamide composition" or "Cyclophosphamide freeze-dried composition". The two terms have the same meaning and can be interchangeably used.

Likewise, "a method for hydrating Cyclophosphamide freeze-dried composition" or "a method for preparing a hydrated Cyclophosphamide freeze-dried composition" have the same meaning and can be used interchangeably herein. It can also be described as "a hydration method according to the present invention".

Correspondingly, the term "hydrated freeze-dried (pharmaceutical) composition", "hydrated composition", "hydrated product" refers to the composition or product which is obtained by hydrating (pharmaceutical) composition in freeze-dried form with the method according to the invention. In an embodiment, the active agent therein is Cyclophosphamide.

When calculating the moisture content in freeze-dried composition or hydrated composition, taking Cyclophosphamide as an example, as the raw material is generally Cyclophosphamide monohydrate, the basis for calculating moisture content in freeze-dried composition and hydrated composition is generally Cyclophosphamide monohydrate. In this case, when Cyclophosphamide is present in the form of monohydrate, anhydrate or mixture thereof, the anhydrate or other possible forms are converted into Cyclophosphamide monohydrate for calculation. Alternatively, the moisture content in composition or product may be calculated based on the weight of the composition or product.

For example, in an embodiment, based on the weight of the Cyclophosphamide monohydrate, the moisture content in the freeze-dried composition is no more than about 9%, preferably no more than about 7%, more preferably no more than about 5.5%, most preferably no more than about 3.5%.

In an alternative embodiment, based on the weight of the freeze-dried composition, the moisture content in the freeze-dried composition is no more than about 5%, such as no more than about 4%, no more than about 3% or no more than about 2%.

In another embodiment, based on the weight of the Cyclophosphamide monohydrate, the moisture content in the hydrated composition is about 4-12%, preferably about 5-10%, more preferably about 6-9%, most preferably about 6.5-9.0%, such as 6.5-8.8%.

In an alternative embodiment, based on the weight of the hydrated composition, the moisture content in the hydrated composition is about 2-7%, preferably about 3-6%, more preferably about 3.5-5.5%, such as about 3.7-5% or about 3.5-5%.

The term "liquid water" refers to water which is used in liquid form. In an embodiment according to the invention, the liquid water may be used in the form of pure water or aqueous solution.

It will be understood that, in the context of the invention, when used in hydrating step, "pure water" is not intended to mean the purity of water but refers to no additional substance like solute is intentionally added in the water. There may be some amount of impurities contained in the pure water used, comprising for example a small amount of minerals which are present in the water. Water in such a form, due to its vast majority of water per se (for example, 95% or more, 98% or more, 99% or more), is also encompassed in the above-mentioned pure water. For example, the liquid water with real high purity such as distilled water, purified water, deionized water or the liquid water without particular requirement for purity like tap-water can be used.

When used in hydrating step, the term "aqueous solution" refers to the solution containing solute wherein water is used as solvent. In the context of the invention, there is no particular limitation to solute contained in the aqueous solution, for example the aqueous solution, which under room temperature produces relative humidity of about 40-100% RH, preferably about 60-98% RH, more preferably about 70-90% RH, such as 70-95% RH can be used, and for example can be selected from the group consisting of pure water, aqueous solution containing one or more of a strong acid, a strong alkali, a glycerol, an inorganic salt and a pharmaceutically acceptable excipient, preferably the aqueous solution containing glycerol or inorganic salt.

The term "aqueous solution containing glycerol", "aqueous solution of glycerol", "solution containing glycerol" and "glycerol solution" refer to the solution containing glycerol as solute, wherein water is used as solvent. The concentration of solute therein can be adjusted according to the required relative humidity and and may be 0-100 wt % based on the total weight of aqueous solution. For example, it can be the concentration of 10 wt %, 20 wt %, 30 wt %, 35 wt %, 40 wt %, 45 wt %, 50 wt %, 55 wt %, 60 wt %, 70 wt %, 80 wt %, 90 wt % or 100 wt %, preferably 20-60 wt %, more preferably 30-50 wt %, especially 35-45 wt %, particularly 40 wt %.

The concentration is calculated based on the total weight of the aqueous solution.

The term "aqueous solution containing inorganic salt", "aqueous solution of inorganic salt", "solution containing inorganic salt" and "inorganic salt solution" refer to the solution containing inorganic salt as solute, wherein water is used as solvent. The examples may be the anion-containing aqueous solution of one or more selected from the group consisting of sodium salt, potassium salt, lithium salt, magnesium salt, calcium salt, ammonium salt, cesium salt, cobalt salt and strontium salt. The anion is counter ion in the solution, for example fluoride ion, chloride ion, bromide ion, iodide ion, acetate, carbonate, bicarbonate, nitrate, sulfate, hydrogen sulfate, chromate, phosphate, hydrogen phosphate, dihydrogen phosphate, citrate or the like. The specific examples comprise but not limited to the aqueous solution of one or more selected from the group consisting of cesium fluoride, lithium bromide, zinc bromide, lithium chloride, calcium bromide, lithium iodide, potassium acetate, potassium fluoride, magnesium chloride, sodium iodide, potassium carbonate, potassium nitrate, sodium bromide, cobalt chloride, potassium iodide, strontium chloride, sodium nitrate, sodium chloride, ammonium chloride, potassium bromide, ammonium sulfate, potassium chloride, strontium nitrate, potassium nitrate, potassium sulfate, potassium chromate, sodium phosphate, sodium dihydrogen phosphate, disodium hydrogen phosphate, potassium phosphate, potassium dihydrogen phosphate, dipotassium hydrogen phosphate, sodium citrate, and potassium citrate, more preferably the aqueous solution of one or more selected from the group consisting of cesium fluoride, lithium bromide, lithium chloride, potassium acetate, magnesium chloride, potassium carbonate, sodium bromide, potassium iodide, sodium chloride, potassium chloride and potassium sulfate.

The aqueous solution containing inorganic salt may be saturated solution or unsaturated solution. The concentration of the solute therein can be adjusted according to required relative humidity and can be concentration of 0-100% saturation. For example, it can be concentration of 5% saturation, 10% saturation, 20% saturation, 30% saturation, 40% saturation, 50% saturation, 60% saturation, 70% saturation, 80% saturation, 90% saturation or 100% saturation.

The term "saturated inorganic salt solution" refers to a solution system wherein the inorganic salt as solute cannot be further solubilized at a certain temperature. The saturated inorganic salt solution is generally prepared from salt and water (e.g. deionized water) with certain purity, wherein some of the salt should be kept as insoluble state. Accordingly, as for the saturated inorganic salt solution, the amount of inorganic salt at given temperature will generally be about 30%-90% more than that for saturation state.

The term "relative humidity (RH)" refers to percentage of real water vapor density ($d_1$) in unit volume of air over saturated water vapor density ($d_2$) at the same temperature, i.e. RH (%)=$d_1/d_2$×100%. A hygrothermograph made of particular temperature and humidity detecting material, e.g. TempTal® 4 electronic hygrothermograph is generally used to determine and record temperature and humidity. The term "room temperature" refers to ambient temperature and is generally 15-30° C. There is no particular limitation to the hydrating process according to the invention with respect to temperature, for example, it may be performed under room temperature.

The term "normal atmosphere" refers to one atmospheric pressure. The term "micro negative pressure" refers to the absolute pressure which slightly lower than one atmospheric pressure, for example about 10-90 kPa, preferably about 30-70 kPa, more preferably about 40-60 kPa, such as 50 kPa. It should be understood by a person skilled in the art that micro negative pressure is calculated relative to one atmosphere pressure.

For example, when the micro negative pressure is N kPa, the actual pressure is one atmosphere pressure minus N kPa. As another example, when the micro negative pressure applied is 50 kPa, the actual pressure is: 101 kPa (one atmosphere pressure is calculated as about 101 kPa)–50 kPa=51 kPa.

The term "redissolving time (reconstitution time)" refers to the time required for reconstituting freeze-dried composition or hydrated composition with certain diluent with shaking to full dissolution. The diluent used may be 0.9% sodium chloride solution or sterile water for injection commonly used in formulation field. For example, as for freeze-dried composition or hydrated composition in 500 mg strength, preferably a redissolving time of no more than 5 min means good redissolving property, and a redissolving time of no more than 2 min means very good redissolving property. As another example, with respect to freeze-dried composition or hydrated composition in 2 g strength, preferably a redissolving time of no more than 10 min means good redissolving property, and a redissolving time of no more than 5 min means very good redissolving property.

The term "stable" refers to CPP freeze-dried composition or hydrated composition which after maintenance under appropriate condition for a period of time has variation of CPP content and impurities within limited ranges. For example, a stable hydrated CPP freeze-dried composition means it has CPP content of 90%-110% within testing period after maintenance under extreme rigor condition (e.g. 45° C. or 40° C./75% RH) for a period of time (e.g. 1 week, 2 weeks or longer), or under accelerated condition (e.g. 30° C./60% RH or 25° C./60% RH) for a period of time (e.g. 1 month, 3 months, 6 months or longer), or under storage condition (e.g. 2-8° C.) for a period of time (e.g. a year or longer).

The term "pharmaceutically acceptable" refers to contact with tissue of the patient within normal medical judgment without inappropriate toxicity, irritation, anaphylaxis etc., having a reasonable beneficial/risk ratio and is effect for target use.

Method for Hydrating

Provided is a method for hydrating Cyclophosphamide freeze-dried composition, comprising:
(a) providing an aqueous solution comprising Cyclophosphamide and an optional pharmaceutically acceptable excipient;
(b) freeze-drying the aqueous solution to give a freeze-dried composition; and
(c) hydrating the freeze-dried composition with liquid water to give the hydrated Cyclophosphamide freeze-dried composition.

Step (a)

In Step (a), preparation of the aqueous solution can be performed in mixing liquid tank. There is no particular limitation to the order for adding Cyclophosphamide and an optional pharmaceutically acceptable excipient into water (e.g. water for injection). For example, the pharmaceutically acceptable excipient is added into water and then Cyclophosphamide is added. Alternatively, Cyclophosphamide is added into water and then the pharmaceutically acceptable excipient is added. When there is no pharmaceutically acceptable excipient, Cyclophosphamide is directly added into water.

In an embodiment, Cyclophosphamide used may be in the form of hydrate (e.g. monohydrate), anhydrate or mixture thereof. In a preferable embodiment, Cyclophosphamide is in the form of monohydrate.

In an embodiment, the pharmaceutically acceptable excipient comprises but not limited to one or more of saccharides, carboxylic acids, amino acids, buffering salts.

The saccharides may be selected from the group consisting of polyalcohol with about 5-about 9 carbon atoms, e.g. mannitol, sorbitol, galactitol or the like; monosaccharide with about 5-10 carbon atoms, particularly natural aldohexose, e.g. glucose (dextrose), mannose, galactose or the like; disaccharide with 12 carbon atoms, e.g. natural sucrose, lactose or the like; polysaccharide, e.g. starch or the like; or one or more of the above saccharides. In a preferable embodiment, the saccharides may be one or more of mannitol, sorbitol, lactose.

Mannitol is an isomer of sorbitol with different orientation of hydroxyl group for 2-carbon atom in these two alcohols. Mannitol is easily soluble in water and is white and transparent solid with sweet taste like sucrose. D-Mannitol may be used as mannitol, for example the commercially available products EMPROVE® from Merck and Pearlitol® from Roquette. Mannitol used comprises but not limited to the form of β-mannitol, δ-mannitol.

In another embodiment, the carboxylic acids may be one or more selected from the group consisting of succinic acid, citric acid, maleic acid and tartaric acid. In a preferable embodiment, the carboxylic acids may be selected from the group consisting of tartaric acid.

In another embodiment, the amino acids may be one or more selected from the group consisting of arginine, serine, glycine, valine and alanine. In a preferable embodiment, the amino acids may be one or more selected from the group consisting of arginine and alanine.

In another embodiment, the buffering salts may be one or more selected from the group consisting of sodium salt or potassium salt of acetic acid, citric acid, carbonic acid and phosphoric acid. In a preferable embodiment, the buffering salts may be preferably one or more of sodium carbonate, sodium bicarbonate.

In an embodiment, the amount of the optional pharmaceutically acceptable excipient, based on the total weight of the pharmaceutical active ingredient (e.g. CPP monohydrate) and the optional pharmaceutically acceptable excipient, may be about 20-90% (w/w), preferably about 25-75% (w/w), more preferably about 30-60% (w/w), even more preferably about 35-45% (w/w), for example including but not limited to 35% (w/w), 41% (w/w), 45% (w/w) or the like.

The above pharmaceutically acceptable excipients are provided for illustration only. Therefore, the pharmaceutical formulation according to the invention comprises the above pharmaceutically acceptable excipients but not limited to the same. A person skilled in the art can make various modifications, changes or equivalences to the above excipients according to conventional technology, which are encompassed within the scope of the invention.

In an embodiment according to the invention, optionally, after Step (a) and before Step (b), sterilization is performed. For example, the aqueous solution may be freeze-dried after sterilization. There is no particular limitation to the process for sterilization, for example the process of filtrating sterilization may be used. In an embodiment according to the invention, the aqueous solution prior to freeze-drying is sterilized with filtration. In a preferable embodiment, the filtrating sterilization is performed with 0.22 μm hydrophilic microfiltration membrane. The microfiltration membrane may have a texture of polyether sulfone (PES), for example one or more selected from the group consisting of commercially available products Millipore Express® from Merck; or of polyvinylidene fluoride (PVDF), for example one or more selected from the group consisting of commercially available products Durapore® from Merck. In a particularly preferable embodiment, the microfiltration membrane for filtrating sterilization may have a texture of PES, for example one or more selected from the group consisting of commercially available products Millipore Express® from Merck, but not limited to the same.

Step (b)

In Step (b), the aqueous solution obtained in Step (a) is freeze-dried. That is, the aqueous solution is frozen for crystallization at low temperature and then the temperature is raised to allow the solvent (water) therein to sublimate from solid to gas directly, so as to give the freeze-dried composition.

In an embodiment according to the invention, the freeze-drying can be performed in freeze-drying bottle. For example, the sizes of 30 ml×75 mm (volume×height), 50 ml×73 mm (volume×height) or 100 ml×100 mm (volume×height) may be used.

In an embodiment, the freezing is performed in the freezing chamber of freeze-drying box. For example, under normal atmosphere, the temperature of the shelf in freeze-drying chamber is lowered to about −20° C. to about −50° C. rapidly.

In a preferable embodiment, the temperature lowering rate may be about 0.1-20° C./min, preferably about 0.1-10° C./min, more preferably about 0.5-5° C./min, for example comprising but not limited to about 1° C./min or the like.

In a preferable embodiment, the temperature of the shelf is finally lowered to about −30° C.-about −60° C., preferably about −35° C.-about −55° C., more preferably about −40° C.-about −50° C., for example comprising but not limited to about −45° C. or the like.

In a preferable embodiment, the time for freezing is about 1-about 10 h, preferably about 2-about 8 h, more preferably about 4-about 6 h, for example comprising but not limited to about 4 h, 5 h, 6 h or the like.

In an embodiment, there is no particular limitation to the temperature raising procedure of the freeze-drying, and it can be done in one temperature raising process or be done in multiple temperature raising processes, for example two, three, four or the like.

In a preferable embodiment, the temperature raising procedure is done in two processes. For example, under vacuum, firstly the shelf in freeze-drying chamber is heated within certain time to a certain temperature for a period of time, till the moisture content in the freeze-dried product is about 0%-about 20%, preferably about 0%-about 10%. Secondly, under vacuum, the shelf in freeze-drying chamber is heated within certain time to a certain temperature for a period of time, till the moisture content in the freeze-dried product is about 0%-about 5%, preferably about 0%-about 3%, so as to give the freeze-dried composition.

In a further preferable embodiment, the first heating rate of the shelf is about 0.1-2° C./min, preferably about 0.1-0.5° C./min. In a further preferable embodiment, the first heating of the shelf is heating to about −10 to about 10° C., preferably about −1° C. to about 9° C.

In a further preferable embodiment, the maintaining time after the first heating of shelf is about 10-about 80 h, preferably about 15-about 70 h. In a further preferable embodiment, the heating rate of the second heating of the shelf is about 0.1-2° C./min, preferably about 0.1-0.5° C./min.

In a further preferable embodiment, the second heating of the shelf is heating to about 15-about 30° C., preferably about 20-about 26° C. In a further preferable embodiment, the maintaining time after second heating of the shelf is about 3-about 30 h, preferably about 4-25 h.

The moisture content in the freeze-dried composition can be determined by the Karl-Fischer direct titrimetric method described in USP 40-NF 35 Method I <921>, or by Karl-Fischer volumetric titrimetric method described in Chinese pharmacopoeia 2015, Section III, General rule (0832 moisture determination).

In an embodiment according to the invention, based on the weight of Cyclophosphamide monohydrate, the moisture content in the freeze-dried composition is no more than about 9%, preferably no more than 7%, more preferably no more than about 5.5%, most preferably no more than about 3.5%.

In an alternative embodiment, based on the weight of the freeze-dried composition, the moisture content in the freeze-dried composition is no more than about 5%, preferably no more than about 4%, more preferably no more than about 3%, most preferably no more than about 2%, for example comprising but not limited to about 3.0%, about 2.9%, about 2.8%, about 2.7%, about 2.6%, about 2.5%, about 2.4%, about 2.3%, about 2.2%, about 2.1%, about 2.0% or the like.

Step (c)

In Step (c), the freeze-dried composition is hydrated with liquid water to give the hydrated freeze-dried composition.

The liquid water refers to water which is used in liquid form when performing hydrating. For example, the liquid water may be used in the form of pure water or aqueous solution. The pure water used comprises but not limited to purified water, distilled water, deionized water, tap-water or the like. The aqueous solution refers to those aqueous solutions under room temperature producing relative humidity of about 40-100% RH, preferably about 60-98% RH, more preferably about 70-90% RH, and for example can be selected from the group consisting of aqueous solutions containing one or more of a strong acid, a strong alkali, a glycerol, an inorganic salt and a pharmaceutically acceptable excipient, preferably aqueous solution containing glycerol or inorganic salt. The aqueous solution can be sterilized according to the properties of the solution, for example by filtrating sterilization or autoclave sterilization. In a specific embodiment, the relative humidity during the hydration Step (c) is about 60 to about 98%, such as 70-90%.

In a preferable embodiment, the strong acid-containing aqueous solution is aqueous solution containing sulphuric acid. In a preferable embodiment, the strong alkali-containing aqueous solution is aqueous solution containing potassium hydroxide or sodium hydroxide.

In an embodiment according to the invention, the inorganic salt-containing aqueous solution is anion-containing aqueous solution of one or more selected from the group consisting of sodium salt, potassium salt, lithium salt, magnesium salt, calcium salt, ammonium salt, cesium salt, cobalt salt and strontium salt, preferably anion-containing aqueous solution of one or more selected from the group consisting of sodium salt, potassium salt, lithium salt, magnesium salt. The anion is counter ion in the solution, for example fluoride ion, chloride ion, bromide ion, iodide ion, acetate, carbonate, bicarbonate, nitrate, sulfate, hydrogen sulfate, chromate, phosphate, hydrogen phosphate, dihydrogen phosphate, citrate or the like. Specific examples are aqueous solutions containing one or more selected from the group consisting of cesium fluoride, lithium bromide, zinc bromide, lithium chloride, calcium bromide, lithium iodide, potassium acetate, potassium fluoride, magnesium chloride, sodium iodide, potassium carbonate, potassium nitrate, sodium bromide, cobalt chloride, potassium iodide, strontium chloride, sodium nitrate, sodium chloride, ammonium chloride, potassium bromide, ammonium sulfate, potassium chloride, strontium nitrate, potassium nitrate, potassium sulfate, potassium chromate, sodium phosphate, sodium dihydrogen phosphate, disodium hydrogen phosphate, potassium phosphate, potassium dihydrogen phosphate, dipotassium hydrogen phosphate, sodium citrate and potassium citrate, more preferably aqueous solutions containing one or more selected from the group consisting of cesium fluoride, lithium bromide, lithium chloride, potassium acetate, magnesium chloride, potassium carbonate, sodium bromide, potassium iodide, sodium chloride, potassium chloride and potassium sulfate.

In a preferable embodiment, the glycerol concentration in the glycerol-containing aqueous solution can be adjusted according to the required relative humidity and can be 0-100 wt % concentration based on total weight of the aqueous solution, for example 10 wt %, 20 wt %, 30 wt %, 35 wt %, 40 wt %, 45 wt %, 50 wt %, 55 wt %, 60 wt %, 70 wt %, 80 wt %, 90 wt % or 100 wt %, preferably 20-60 wt %, more preferably 30-50 wt %.

In a preferable embodiment, the inorganic salt concentration in the inorganic salt-containing aqueous solution can be adjusted according to the required relative humidity and can be concentration of 0-100% saturation, for example 5% saturation, 10% saturation, 20% saturation, 30% saturation, 40% saturation, 50% saturation, 60% saturation, 70% saturation, 80% saturation, 90% saturation or 100% saturation.

In another embodiment according to the invention, the pharmaceutically acceptable excipient-containing aqueous solution is the aqueous solution containing one or more selected from the group consisting of saccharides, organic solvents and surfactants.

In another embodiment according to the invention, the saccharides-containing aqueous solution may be aqueous solutions of polyalcohol with about 5-about 9 carbon atoms, e.g. mannitol, sorbitol, galactitol or the like; monosaccharide with about 5-10 carbon atoms, particularly natural aldohexose, e.g. glucose (dextrose), mannose, galactose or the like; disaccharide with 12 carbon atoms, e.g. natural sucrose, lactose or the like; polysaccharide, e.g. starch or the like; or one or more of the above saccharides. In a preferable embodiment, the saccharides-containing aqueous solution is aqueous solution containing one or more of mannitol, sorbitol and lactose.

In another embodiment according to the invention, the organic solvents-containing aqueous solution may be aqueous solution of one or more selected from the group consisting of methanol, ethanol, propanediol, polyethylene glycol 200, polyethylene glycol 400 and polyethylene glycol 600.

In yet another embodiment according to the invention, the concentration of organic solvents in the organic solvents-containing aqueous solution can be adjusted according to the required relative humidity.

In a preferable embodiment, the surfactants are selected from the group consisting of sodium dodecyl sulfate (SDS), oxirane-epoxypropane block copolymer, polyvinylether, sorbitan ester, polyoxyethylene sorbitan ester, polyoxyethylene fatty acid ester, polyoxyethylene castor oil and derivative thereof, polyethylene glycol fatty acid ester, or combination thereof.

In a more preferable embodiment, the surfactants are one or more selected from the group consisting of oxirane-epoxypropane block copolymer, polyoxyethylene sorbitan ester, polyoxyethylene castor oil and derivative thereof, most preferably one or more of Poloxamer 188, Polyoxyethylene (20) sorbitan monoleate (Tween® 80) and polyoxyethylene hydrogenated castor oil (Cremophor® RH40).

In another embodiment according to the invention, the concentration of surfactant in the surfactant-containing aqueous solution can be adjusted according to required relative humidity.

If necessary, the liquid water can be subjected to sterilization prior to use, for example by filtrating sterilization or steaming sterilization.

There is no particular limitation to the amount of liquid water used in the method according to the invention, which mainly depends on the exposure surface and volume of the freeze-drying chamber. It is required that the introduced amount of liquid water maintains the relative humidity in the freeze-drying chamber about 40-100% RH (e.g. 50-100% RH), preferably about 60-98% RH, more preferably about 70-90% RH. For example, when the volume of freeze-drying chamber is 0.2 m³ and the exposure surface of aqueous solution is 0.1-0.2 m², the amount of aqueous solution is about 100-about 1000 g.

There is no particular limitation to the means for hydrating with liquid water according to the invention, and the liquid water can be introduced by various ways to maintain the freeze-drying chamber required relative humidity, for example under normal temperature/normal atmosphere or normal temperature/micro negative pressure, about 40-100% RH (e.g. 50-100% RH), preferably about 60-98% RH, more preferably about 70-90% RH. For example, the following exemplary procedures may be used: 1) after completion of freeze-drying, when the freeze-drying chamber returns to normal atmosphere/room temperature, the front box door is opened and the sterile liquid water is placed on the baseplate or shelf tray of the freeze-drying chamber, the box door is closed and the hydration is performed under normal temperature/normal atmosphere or normal temperature/micro negative pressure; 2) after completion of freeze-drying, when the freeze-drying chamber returns to normal atmosphere/room temperature, the liquid water is introduced to baseplate or shelf tray of the freeze-drying chamber via pipeline and the hydration is performed under normal temperature/normal atmosphere or normal temperature/micro negative pressure; 3) after completion of freeze-drying, when the freeze-drying chamber returns to normal atmosphere/room temperature, the closed container placed on the baseplate or shelf tray of the freeze-drying chamber in advance is opened by electronic controller and the hydration is performed under normal temperature/normal atmosphere or normal temperature/micro negative pressure. Without being bound by any theory, although hydration under normal atmosphere and hydration under micro negative pressure do not have significant influence on the final outcome of hydration, it is believed that micro negative pressure can accelerate the process of hydration, thereby enhancing the effectiveness of industrial production.

Likewise, the moisture content in hydrated freeze-dried composition can be determined by the Karl-Fischer direct titrimetric method described in USP 40-NF 35 Method I <921>, or by Karl-Fischer volumetric titrimetric method described in Chinese pharmacopoeia 2015, Section III, General rule (0832 moisture determination).

The hydration in Step (c) can be performed under normal temperature, for example 15-30° C.

The hydration in Step (c) can be performed under normal atmosphere or micro negative pressure. For example, the micro negative pressure may be about 10-90 kPa, preferably about 30-70 kPa, more preferably about 40-60 kPa, e.g. about 60 kPa.

After hydration in Step (c), based on Cyclophosphamide monohydrate, the moisture content in the obtained hydrated composition is about 4-12%, preferably about 5-10%, more preferably about 6-9%, most preferably about 6.5-9.0%, such as 6.5-8.8%, for example, comprising but not limited to about 6.5%, about 6.6%, about 6.7%, about 6.8%, about 6.9%, about 7.0%, about 7.1%, about 7.2%, about 7.3%, about 7.4%, about 7.5%, about 7.6%, about 7.7%, about 7.8%, about 7.9%, about 8.0%, about 8.1%, about 8.2%, about 8.3%, about 8.4%, about 8.5%, about 8.6%, about 8.7%, about 8.8%, about 8.9% and about 9.0%.

Alternatively, after hydration in Step (c), based on the weight of hydrated composition, the moisture content in the hydrated composition is about 2-7%, preferably about 3-6%, e.g. 3.7-5%, more preferably about 3.5-5.5%, e.g. 3.5-5%, for example, comprising but not limited to about 3.3%, about 3.4%, 3.5%, about 3.6%, about 3.7%, about 3.8%, about 3.9%, 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4% and about 5.5%.

When the moisture content in the hydrated composition is higher than about 12% (based on Cyclophosphamide monohydrate) or higher than about 7% (based on hydrated composition), the obtained product does not have satisfactory appearance nor is stable with respect to pharmaceutics. When the moisture in hydrated composition is insufficient, particularly less than about 4% (based on Cyclophosphamide monohydrate), the hydrated composition under room temperature will show melting. The CPP freeze-dried composition cannot be maintained homogeneous for freeze-dried cake during storage when the moisture content is too high or too low.

The time for hydration in Step (c) can be adjusted according to practical requirements.

For example, with respect to CPP freeze-dried composition in 500 mg strength, it can be performed for about 8 h or longer, about 12 h or longer, about 16 h or longer, about 20 h or longer, about 24 h or longer, about 32 h or longer, about 40 h or longer, or it can be performed for about 4-40 h, e.g. about 8-32 h, about 12-28 h, about 16 h, about 24 h or the like.

For example, with respect to CPP freeze-dried composition in 2 g strength, it can be performed for about 12 h or longer, about 24 h or longer, about 36 h or longer, about 48 h or longer, about 72 h or longer, about 96 h or longer, about 120 h or longer, or it can be performed for about 12-120 h, e.g. about 12-48 h, about 12-36 h, about 48-120 h, about 48-96 h, about 24 h, about 72 h or the like.

Accordingly, provided is also a freeze-dried CPP composition with hydrating treatment or hydrated CPP freeze-dried composition, which is obtained by the method according to the invention.

In a preferable embodiment, Cyclophosphamide in the composition is in the form of monohydrate (CPP monohydrate). In a specific embodiment, the composition comprises a pharmaceutically acceptable excipient, preferably mannitol, particularly S-mannitol. In some specific embodiments, the composition according to the invention can be in the form of injectable composition or (sterile) injectable formulation. In other specific embodiments, the composition according to the invention can be made as 500 mg, 1000 mg or 2000 mg strength.

In an embodiment, the freeze-dried composition with hydrating treatment has homogenous and plump appearance. In a preferable embodiment, the freeze-dried composition with hydrating treatment has one or more following features: based on Cyclophosphamide monohydrate, the moisture content is about 4-12%, preferably about 5-10%, more preferably about 6-9%, most preferably about 6.5-8.8%; based on the weight of the hydrated composition, the moisture content of the hydrated composition is about 2-7%, preferably about 3-6%, such as about 3.7-5%, 3.5-5.5%; it is stable in storage against degradation; the volume keeps unchanged with loose texture; it has excellent appearance; it is sterilized against contamination.

Composition

In an aspect, provided is a composition comprising hydrated freeze-dried Cyclophosphamide.

In an embodiment, based on the weight of the composition, the moisture content of the composition according to the invention is no more than about 5.5%. In another embodiment, based on the weight of the composition, the moisture content of the composition according to the invention is no less than about 3.5%. In some embodiments, based on the weight of the composition, the moisture content of the composition according to the invention comprises but not limited to about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4% and about 5.5%, especially about 4%.

The composition comprising hydrated freeze-dried Cyclophosphamide according to the invention shows excellent stability.

In an embodiment, based on the weight of the composition, the composition comprises at least about 90%, preferably at least about 95%, more preferably at least about 99% cyclophosphamide after 3 weeks at 45° C. In another embodiment, based on the weight of composition, the composition comprises at least about 95%, preferably at least about 99% cyclophosphamide after 1 month at 45° C. and 75% relative humidity. In another embodiment, based on the weight of composition, the composition comprises at least about 90%, preferably at least about 95%, more preferably at least about 99% cyclophosphamide after 3 months at 40° C. and 75% relative humidity. The the composition is preferably used in injection, particularly sterile injection.

In an embodiment, the stability of the composition according to the invention is also reflected in the relatively low content of impurities A, B, D after a certain amount of time. For example, the composition comprises less than 0.7% cyclophosphamide impurity B, as measured by HPLC, after the composition is redissolved in diluent and maintained at room temperature for up to 6 hours. In another embodiment, the content of cyclophosphamide impurity D is less than about 0.6% under such condition. In yet another embodiment, the content of cyclophosphamide impurity A is less than about 0.05% under such condition. In some embodiments, the content of total impurities is less than about 1.5%. In further embodiments, the composition comprises at least about 95%, preferably at least about 98% cyclophosphamide. The diluent used may be, e.g. 0.9% sodium chloride solution.

As another example, the composition according to the invention comprises less than about 1.2% cyclophosphamide impurity B, as measured by HPLC, after the composition is redissolved in diluent and maintained at room temperature for up to 12 hours. In another embodiment, the content of cyclophosphamide impurity D is less than about 0.7% under such condition. In yet another embodiment, the content of cyclophosphamide impurity A is less than about 0.05%. In some embodiments, the content of total impurities is less than about 2.2%. In further embodiments, the composition comprises at least about 95%, preferably at least about 98% cyclophosphamide. The diluent used may be, e.g. 0.9% sodium chloride solution.

In an embodiment, after the composition according to the invention is placed for 1 week at 45° C., the content of impurity B is less than about 0.1%, preferably less than about 0.05%, more preferably less than about 0.02%. In another embodiment, after the composition according to the invention is placed for 1 week at 45° C., the content of impurity D is less than about 0.85%, preferably less than about 0.80%, more preferably less than about 0.75%. In another embodiment, after the composition according to the invention is placed for 1 week at 45° C., the content of impurity A is less than about 0.1%, preferably less than about 0.05%. Under such condition, the content of total impurities is less than 1.3%, preferably less than 1.1%, more preferably less than 1.0%. The content of the impurities can be measured by HPLC.

In an embodiment, after the composition according to the invention is placed for 2 weeks at 45° C., the content of impurity B is less than about 0.10%, preferably less than about 0.05%. In another embodiment, after the composition according to the invention is placed for 2 weeks at 45° C., the content of impurity D is less than about 1.0%, preferably less than about 0.9%, more preferably less than about 0.8%. In yet another embodiment, after the composition according to the invention is placed for 2 weeks at 45° C., the content of impurity A is less than about 0.1%, preferably less than about 0.05%. Under such condition, the content of total impurities is less than about 1.3%, preferably less than 1.1%, more preferably less than 1.0%. The content of the impurities can be measured by HPLC.

Accordingly, provided is also a composition, based on the weight of the composition, the composition comprising at least about 95% cyclophosphamide after 1 month at 40° C. and 75% relative humidity; or based on the weight of the composition, the composition comprising at least about 90% cyclophosphamide after 3 months at 40° C. and 75% relative humidity. Provided is also an injectable composition, comprising at least about 95% cyclophosphamide and less than 0.7% cyclophosphamide impurity B, as measured by HPLC, after the composition is redissolved in diluent and maintained at room temperature for up to 6 hours. Alternatively, provided is also a sterile injectable formulation, prepared by the (hydrated) composition according to the invention and diluent, wherein based on the weight of the composition, the composition comprises hydrated cyclophosphamide with a moisture content of no less than about 3.5%; or in another embodiment, with a moisture content of no more than about 5.5%. Further, provided is also a sterile injectable formulation, prepared by mixing the (hydrated) composition according to the invention with diluent, wherein the freeze-dried composition comprises hydrated cyclophosphamide, and wherein the formulation comprises at least about 95% (e.g., at least about 98%) cyclophosphamide and less than 0.7% cyclophosphamide impurity B, as measured by HPLC, when the formulation is maintained at room temperature for up to 6 hours after redissolving.

For application, the composition according to the invention can show excellent redissolving property. In an embodiment, redissolving time of the composition according to the invention in diluent is less than 5 minutes, preferably less than 3 minutes, more preferably less than 2 minutes, e.g., less than 1 minute. Redissolving time may be measured on, e.g. 500 mg, 1 g or 2 g strength. The dilution used may be, e.g. 0.9% sodium chloride solution.

In an embodiment, the bulk density of the composition according to the invention is less than about 0.0650 g/mL, e.g., less than about 0.0600, such as about 0.055 g/mL, about 0.052 g/mL, about 0.05 g/mL.

In an embodiment, the tapped density of the composition according to the invention is about less than 0.3500 g/mL, e.g., less than about 0.3000 g/mL, such as about 0.26 g/mL, about 0.23 g/mL, about 0.2 g/mL, about 0.19 g/mL.

In an embodiment, the skeletal density of the composition according to the invention is more than about 1.3000 g/mL, e.g., more than about 1.4700 g/mL, such as about 1.48 g/mL, about 1.5 g/mL, about 1.52 g/mL, about 1.6 g/mL.

In an embodiment, the porosity of the composition according to the invention is more than about 94%, e.g., more than about 96%, such as about 97%, about 98%.

Composition according to the invention may also be characterized by particle size distribution. In an embodiment, the particle size distribution of the composition is characterized by a D50 value of less than 11.0 μm. In another embodiment, the particle size distribution of the composition is characterized by a D90 value of less than 36.0 μm, e.g., less than 29.0 μm. In another embodiment, the particle size distribution of the composition is characterized by a D10 value of less than 4.0 μm, e.g., less than 3.5 μm.

Accordingly, provided is also a composition having at least one of the following: i) the bulk density is less than about 0.0600 g/mL; ii) the tapped density is less than about 0.300 g/ml; iii) the skeletal density is greater than 1.4700 g/mL; iv) the porosity is greater than 96%. Alternatively, provided is also a composition having at least one of the following: i) the particle size distribution is characterized by a D50 value of less than 11.0 μm; ii) the particle size distribution is characterized by a D90 value of less than 36.0 μm, e.g., less than 29.0 μm.

In an embodiment, the XRD pattern of the composition according to the invention or the hydrated freeze-dried Cyclophosphamide contained therein has characteristic peaks at 20.4°, 23.6°, 23.7° and 25.2° of 2θ±0.2 2θ.

Figure 2:
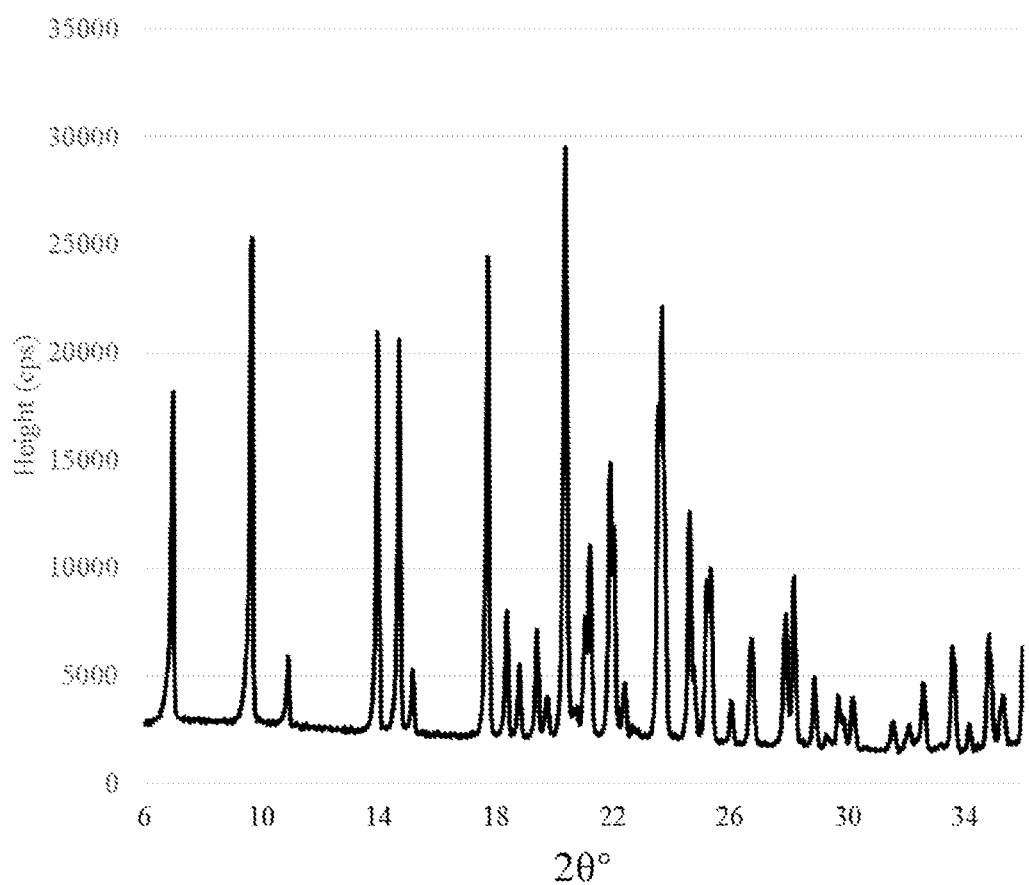
FIG. 2 depicts an XRD pattern of a CPP freeze-dried composition hydrated with pure water.

In a specific embodiment, the crystalline form of hydrated CPP freeze-dried composition which is hydrated by pure water has characteristic peaks at 20.4°, 23.6°, 23.7° and 25.2° of 2θ±0.2° 2θ. It may further have characteristic peaks at 20.4°, 21.9°, 22.1°, 23.6°, 23.7°, 25.2°, and 25.4° of 2θ±0.2° 2θ. In a further embodiment, the characteristic peaks of the XRD pattern of the hydrated CPP freeze-dried composition which is hydrated by pure water are as shown in Table 15. In a further embodiment, the XRD pattern of the hydrated CPP freeze-dried composition which is hydrated by pure water is (substantially) as shown in FIG. 2.

Figure 3:
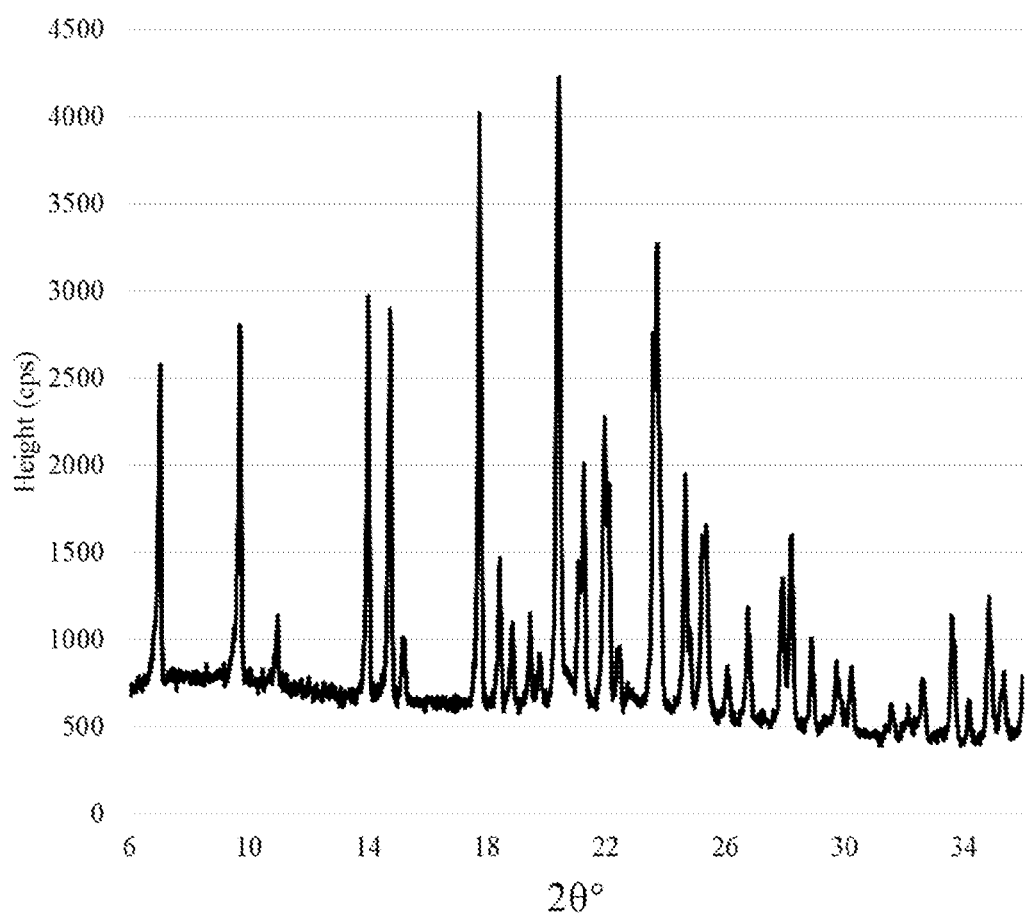
FIG. 3 depicts an XRD pattern of a CPP freeze-dried composition hydrated with sodium chloride solution (70%).

In another specific embodiment, the crystalline form of hydrated CPP freeze-dried composition which is hydrated by sodium chloride solution (70%) has characteristic peaks at 20.4°, 21.9°, 23.6° and 23.7° of 2θ0.2° 2θ. It may further have characteristic peaks at 20.4°, 21.9°, 22.1°, 23.6°, 23.7° and 25.4° of 2θ±0.2° 2θ. In a further embodiment, the characteristic peaks of the XRD pattern of the hydrated CPP freeze-dried composition which is hydrated by sodium chloride solution (70%) are as shown in Table 16. In a further embodiment, the XRD pattern of the hydrated CPP freeze-dried composition which is hydrated by sodium chloride solution (70%) is (substantially) as shown in FIG. 3.

Figure 4:
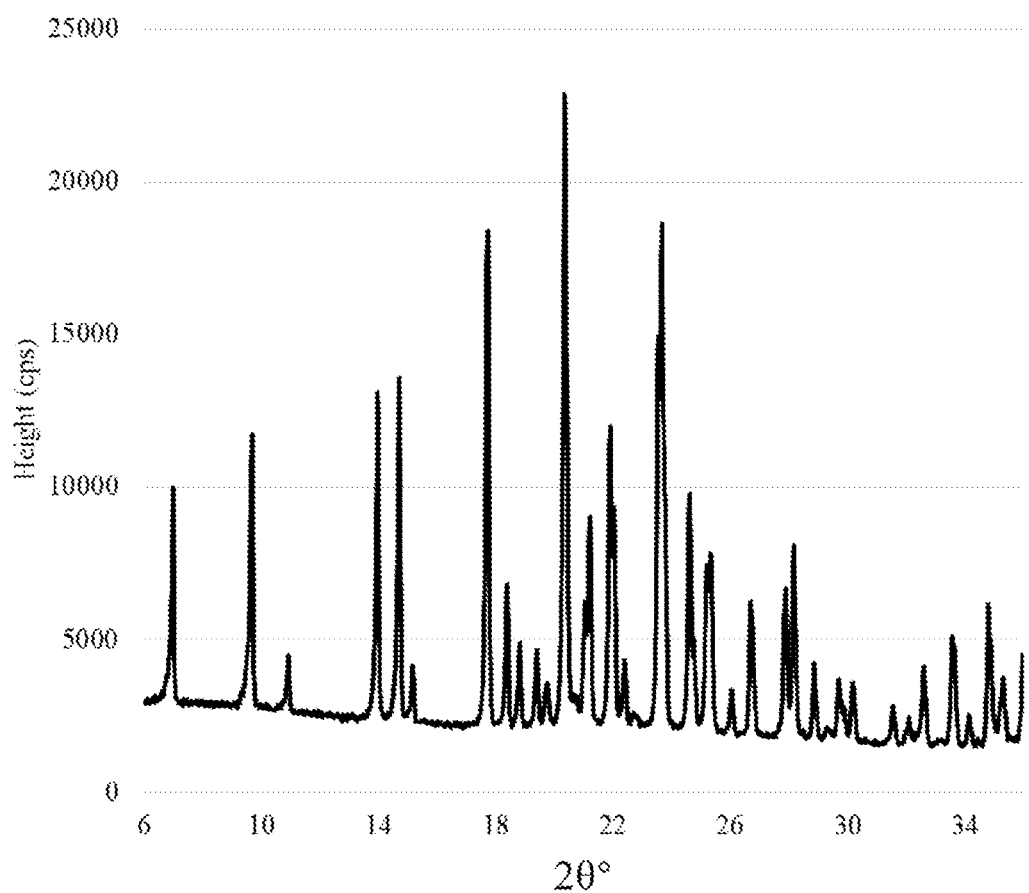
FIG. 4 depicts an XRD pattern of a CPP freeze-dried composition hydrated with glycerin solution (40%).

In yet another specific embodiment, the crystalline form of hydrated CPP freeze-dried composition which is hydrated by glycerin solution (40%) has characteristic peaks at 20.4°, 23.6°, 23.7° and 25.2° of 2θ0.2° 2θ. It may further have characteristic peaks at 20.4°, 21.9°, 22.1°, 23.6°, 23.7°, 25.2° and 25.3° of 2θ0.2° 2θ. In a further embodiment, the characteristic peaks of the XRD pattern of the hydrated CPP freeze-dried composition which is hydrated by glycerin solution (40%) as as shown in Table 17. In a further embodiment, the XRD pattern of the hydrated CPP freeze-dried composition which is hydrated by glycerin solution (40%) is (substantially) as shown in FIG. 4.

In a preferable embodiment, the cyclophosphamide in the composition according to the invention is in the form of monohydrate (CPP monohydrate).

In an embodiment, the composition according to the invention may also comprise a pharmaceutically acceptable excipient. The pharmaceutically acceptable excipient may be referred to those described above for step (a). In an embodiment, the pharmaceutically acceptable excipient is one or more selected from the group consisting of saccharides, carboxylic acids, amino acids and buffering salts, preferably saccharides, such as mannitol, particularly δ-mannitol. In a specific embodiment, the composition according to the invention comprises mannitol, preferably 6-mannitol. In another embodiment, the pharmaceutically acceptable excipient, based on the total weight of the pharmaceutical active ingredient (e.g., CPP monohydrate) and the optional pharmaceutically acceptable excipient, may be about 20-90% (w/w), preferably about 25-75% (w/w), more preferably about 30-60% (w/w), even more preferably about 35-45% (w/w), for example including but not limited to 35% (w/w), 41% (w/w), 45% (w/w) or the like.

In some specific embodiments, the composition according to the invention may be in the form of injectable composition or (sterile) injectable formulation. In other specific embodiments, composition according to the invention may be made in 500 mg, 1000 mg or 2000 mg strength.

In an embodiment according to the invention, the composition comprising hydrated freeze-dried cyclophosphamide may be prepared by the method according to the invention.

In an embodiment, the composition according to the invention has homogenous and plump appearance. In another embodiment, the composition according to the invention has one or more following features: based on Cyclophosphamide monohydrate, the moisture content is about 4-12%, preferably about 5-10%, more preferably about 6-9%, most preferably about 6.5-9.0%, e.g. 6.5-8.8%; based on the weight of the hydrated composition, the moisture content of the hydrated composition is about 2-7%, preferably 3-6%, such as about 3.7-5%, 3.5-5.5%; it is stable in storage against degradation; the volume keeps unchanged with loose texture; it has excellent appearance; it is sterilized against contamination.

The embodiments according to the invention may be listed as below:
1. A method for hydrating a Cyclophosphamide freeze-dried composition, comprising:
    (a) providing an aqueous solution comprising Cyclophosphamide and an optional pharmaceutically acceptable excipient;
    (b) freeze-drying the aqueous solution to give a freeze-dried composition; and
    (c) hydrating the freeze-dried composition with liquid water to give the hydrated Cyclophosphamide freeze-dried composition.
2. The method of 1, wherein the Cyclophosphamide in step (a) is in the form of hydrate, anhydrate or mixture thereof, preferably Cyclophosphamide monohydrate.
3. The method according to anyone of 1-2, wherein based on the weight of the cyclophosphamide monohydrate, the moisture content of the freeze-dried composition obtained in step (b) is no more than about 9%, preferably no more than about than 7%, more preferably no more than about 5.5%.
4. The method of according to anyone of 1-3, wherein the liquid water is in the form of pure water or aqueous solution.
5. The method of 4, wherein the aqueous solution is the aqueous solution comprising one or more species selected from the group consisting of a strong acid, a strong alkali, a glycerol, an inorganic salt, and a pharmaceutically acceptable excipient, preferably an aqueous containing glycerol or inorganic salt.
6. The method of 5, wherein the glycerol concentration in the aqueous solution containing glycerol is 0-100%, preferably 20%-60%, more preferably 30%-50 wt %, especially 35-45 wt %, particularly 40 wt %.
7. The method of 5, wherein the aqueous solution containing inorganic salt is the anion-containing aqueous solution of one or more selected from the group consisting of sodium salt, potassium salt, lithium salt, magnesium salt, calcium salt, ammonium salt, cesium salt, cobalt salt and strontium salt, preferably the aqueous solution containing one or more selected from the group consisting of cesium fluoride, lithium bromide, zinc bromide, lithium chloride, calcium bromide, lithium iodide, potassium acetate, potassium fluoride, magnesium chloride, sodium iodide, potassium carbonate, potassium nitrate, sodium bromide, cobalt chloride, potassium iodide, strontium chloride, sodium nitrate, sodium chloride, ammonium chloride, potassium bromide, ammonium sulfate, potassium chloride, strontium nitrate, potassium nitrate, potassium sulfate, potassium chromate, sodium phosphate, sodium dihydrogen phosphate, disodium hydrogen phosphate, potassium phosphate, potassium dihydrogen phosphate, dipotassium hydrogen phosphate, sodium citrate and potassium citrate, more preferably the aqueous solution containing one or more selected from the group consisting of cesium fluoride, lithium bromide, lithium chloride, potassium acetate, magnesium chloride, potassium carbonate, sodium bromide, potassium iodide, sodium chloride, potassium chloride and potassium sulfate.
8. The method of 7, wherein the inorganic salt concentration of the aqueous solution containing inorganic salt is 0-100% saturation.
9. The method of 5, wherein the aqueous solution containing pharmaceutically acceptable excipient is an aqueous solution containing one or more selected from the group consisting of saccharides, organic solvents, and surfactants; preferably an aqueous solution containing saccharides such as mannitol.
10. The method of anyone of 1-9, wherein the hydrating is performed under normal atmosphere or micro negative pressure, the micro negative pressure is about 10-90 kPa, preferably about 30-70 kPa, more preferably about 40-60 kPa.
11. The method of anyone of 1-10, wherein based on the weight of the Cyclophosphamide monohydrate, the moisture content of the hydrated Cyclophosphamide freeze-dried composition obtained in step (c) is about 4-12%, preferably about 5-10%, more preferably about 6-9%; and/or based on the weight of the hydrated composition, the moisture content of the hydrated Cyclophosphamide freeze-dried composition obtained in step (c) is about 2-7%, preferably about 3-6%, more preferably about 3.5-5.5%, 3.7-5%.
12. A hydrated Cyclophosphamide freeze-dried composition, which is obtained by the method according to anyone of 1-11.
13. The hydrated freeze-dried composition of 12, wherein based on the weight of cyclophosphamide monohydrate, the moisture content of the composition is about 4-12%, preferably about 5-10%, more preferably about 6-9%; and/or based on the weight of composition, the moisture content of the composition is about 2-7%, preferably about 3-6%, more preferably about 3.5-5.5%, about 3.7-5%.

14. A method for preparing a hydrated Cyclophosphamide freeze-dried composition, comprising:
    (a) providing an aqueous solution comprising Cyclophosphamide;
    (b) freeze-drying the aqueous solution to give a freeze-dried composition; and
    (c) hydrating the freeze-dried composition with liquid water to give the hydrated Cyclophosphamide freeze-dried composition.
15. The method of 14, wherein based on the weight of the cyclophosphamide, the moisture content of the freeze-dried composition obtained in step (b) is no more than about 5.5%.
16. The method of 14, wherein the liquid water is in the form of pure water or aqueous solution, the aqueous solution comprising one or more selected from the group consisting of a strong acid, a strong alkali, a glycerol, an inorganic salt, and a pharmaceutically acceptable excipient.
17. The method of 16, wherein the aqueous solution is a sodium chloride solution of 70% saturation and the relative humidity during the hydration step (c) is from about 70% to about 95%.
18. The method of 17, wherein the XRD pattern of the hydrated Cyclophosphamide freeze-dried composition has characteristic peaks at 20.4°, 23.6°, 23.7°, and 25.2° of 2θ±0.2 2θ.
19. A freeze-dried composition, which comprises at least about 99% Cyclophosphamide after 3 weeks at 45° C.
20. A freeze-dried composition, wherein based on the weight of the composition, the composition comprises at least about 99% cyclophosphamide after 1 month at 40° C. and 75% relative humidity.
21. The composition of 20, wherein redissolving time of the composition in diluent is less than 2 minutes.
22. A composition, comprising hydrated freeze-dried cyclophosphamide, wherein based on the weight of the composition, the moisture content of the composition is no more than about 5.5%.
23. An injectable composition, based on the weight of composition, comprising at least about 99% cyclophosphamide after 3 weeks at 45° C.
24. An injectable composition, based on the weight of composition, comprising at least about 99% cyclophosphamide after 1 month at 45° C. and 75% relative humidity.
25. The composition of 11, wherein the redissolving time of the composition in diluent is less than 2 minutes.
26. An injectable composition, comprising at least about 98% cyclophosphamide and less than 0.7% cyclophosphamide impurity B, as measured by HPLC, after the composition is redissolved in diluent and maintained at room temperature for up to 6 hours.
27. An injectable composition, comprising less than 0.1% cyclophosphamide impurity B, as measured by HPLC, after up to 7 days at 45° C.
28. An injectable composition, comprising less than 0.1% cyclophosphamide impurity A, as measured by HPLC, after up to 7 days at 45° C.
29. A sterile injectable formulation, prepared by mixing a freeze-dried composition with diluent, wherein the freeze-dried composition comprises hydrated cyclophosphamide with a moisture content of no more than about 5.5%, based on weight of the composition.
30. A sterile injectable formulation, prepared by mixing a freeze-dried composition with diluent, wherein the freeze-dried composition comprises hydrated cyclophosphamide, and wherein the formulation comprises at least about 98% cyclophosphamide and less than 0.7% cyclophosphamide impurity B, as measured by HPLC, when the formulation is maintained at room temperature for up to 6 hours after redissolving.
31. A composition, which comprises freeze-dried Cyclophosphamide, wherein the XRD pattern of the Cyclophosphamide has characteristic peaks at 20.4°, 23.6°, 23.7°, and 25.2° of 2θ±0.2 2θ.
32. The composition of 31, which further comprises a detectable amount of species selected from the group consisting of a strong acid, a strong alkali, a glycerol, an inorganic salt, and a pharmaceutically acceptable excipient.
33. An injectable composition, which comprises freeze-dried Cyclophosphamide, wherein the XRD pattern of the Cyclophosphamide has characteristic peaks at 20.4°, 23.6°, 23.7°, and 25.2° of 2θ±0.2 2θ.
34. The composition of 33, which further comprises a detectable amount of species selected from the group consisting of a strong acid, a strong alkali, a glycerol, an inorganic salt, and a pharmaceutically acceptable excipient.
35. An injectable composition, based on the weight of composition, the composition comprising at least about 99% cyclophosphamide after 3 months at 45° C. and 75% relative humidity.
36. The composition of 22, wherein the redissolving time of the composition in diluent is less than 2 minutes.
37. A freeze-dried composition comprising Cyclophosphamide, wherein the bulk density of the composition is less than about 0.0600 g/mL.
38. A freeze-dried composition comprising Cyclophosphamide, wherein the tapped density of the composition is less than about 0.300 g/mL.
39. A freeze-dried composition comprising Cyclophosphamide, wherein the skeletal density of the composition is greater than about 1.4700 g/mL.
40. A freeze-dried composition comprising Cyclophosphamide, wherein the porosity of the composition is greater than about 96%.
41. A freeze-dried composition comprising Cyclophosphamide, wherein the particle size distribution of the composition is characterized by a D50 value of less than 11.0 μm.
42. An injectable composition comprising Cyclophosphamide, wherein the particle size distribution of the composition is characterized by a D50 value of less than 11.0 μm.
43. A freeze-dried composition comprising Cyclophosphamide, wherein the particle size distribution of the composition is characterized by a D90 value of less than 36.0 μm.
44. The composition of 43, wherein the particle size distribution of the composition is characterized by a D90 value of less than 29.0 μm.
45. An injectable composition comprising Cyclophosphamide, wherein the particle size distribution of the composition is characterized by a D90 value of less than 36.0 μm.
46. An injectable composition comprising Cyclophosphamide, wherein the particle size distribution of the composition is characterized by a D90 value of less than 29.0 μm.

Beneficial Effect

With respect to the pharmaceutical active ingredients like CPP, it has certain requirements for moisture content in terms of stability and the moisture content should not be over high or over low. Therefore, it is essential to maintain certain moisture content for the stability. The problem with the past and current preparations of freeze-dried products lies in: it is convenient to use simple freeze-drying process to freeze-dry the moisture content in the composition to a certain range; in commercial production, however, it is difficult to maintain the moisture contents in all freeze-drying bottles uniform by controlling freeze-drying process. There are some methods for hydrating products after freeze-drying. For example, the sterile air/nitrogen with certain humidity is introduced into freeze-drying chamber. However, it is difficult to prepare the sterile air/nitrogen with given humidity, to control the relative humidity in freeze-drying chamber and to keep the whole process sterile. The problem with the current and past methods is that each step required opening machines or freeze-drying chambers, thereby exposing contents to the ambient (potentially contaminated) air. Alternatively, certain calculated amount of hot water vapor is introduced into freeze-drying chamber with high vacuum in a short time. This process, however, requires complex calculation and it is difficult to prepare and introduce hot water vapor. In addition, over saturation is common for water vapor and water drops will easily occur around the freeze-drying penicillin bottles or in freeze-drying box, which not only contaminates the freeze-dried composition but also renders the hydration of freeze-dried composition inhomogeneity. Moreover, the above processes are not suitable for commercial production.

Various embodiments solve these problems by using liquid water to hydrate freeze-dried composition comprising pharmaceutical active ingredient CPP, then the hydrated freeze-dried composition with moisture content in a satisfied range can be obtained, thereby solving the defect of low stability in storage. Further, the storage stability of the obtained freeze-dried formulation is better than the past or current methods. In addition, the hydration of CPP freeze-dried composition with liquid water or aqueous solution is superior in operation and can maintain all hydrated freeze-dried formulation in freeze-drying chamber homogenous and little difference in batches.

As compared to other methods, the hydrating process has the advantages in that, easy operation, safety, low cost, effective reduction of difference in batches, better storage stability, and being suitable for commercial production. Moreover, the hydrated products according to the invention do not contain glycerol, which satisfies the requirements related to injectable formulation.

EXAMPLES

The technical solutions will be described by referring to the working, but non-limiting, Examples below. It will be appreciated that the examples are provided for illustrative purpose rather than limitation to the scope of the invention. The invention may have other embodiments or may be practiced or carried out in various ways. Unless stated otherwise, the percentage, part, ratio herein are calculated on weight basis. Unless stated otherwise, the solution herein refers to aqueous solution.

The pharmaceutical raw materials and excipients are commercially available. For example, Cyclophosphamide is purchased from Lianyungang Guike Pharmaceutical Co. Ltd., Haizheng or Hetero; mannitol is purchased from Merck.

Determination and Assessment of Physicochemical Properties

Moisture determination: Karl-Fischer volumetric titrimetric method described in Chinese pharmacopoeia 2015, Section III, General rule (0832 moisture determination) is used. Karl-Fischer moisture meter (model MKS AT-520, KEM) is used to determine moisture content: an appropriate amount of test sample is weighed precisely (for example, active ingredient CPP, CPP freeze-dried composition or hydrated CPP freeze-dried composition, about 1-5 ml of Fischer solution is used) and is placed in dry conical flask with plug, to which is added an appropriate amount of anhydrous methanol and Fischer solution is used for titration with constant shaking (or stirring) till the solution turns reddish brown from light yellow. A blank test is also performed. Calculation is as follows:

$$\text{Moisture content in test sample (\%)} = \frac{(A-B)F}{W} \times 100\%$$

wherein
A is the volume of Fischer solution used for test sample, ml;
B is the volume of Fischer solution used for blank, ml;
F is weight of water corresponding to 1 ml of Fischer solution, mg;
W is weight of test sample, mg.

Content Determination:

The hydrated CPP freeze-dried composition in 500 mg strength is used as an example.

Preparation of sample stock solution (1 mg/ml anhydrous Cyclophosphamide): an appropriate amount of water is added into sample bottle with shaking until complete dissolution of the sample, which is transferred to 500 ml volumetric flask. The sample bottle is washed with pure water to ensure complete transfer of all samples into the volumetric flask. The volumetric flask is metered with pure water into calibration and shaken for homogeneity.

Preparation of sample solution (0.5 mg/ml anhydrous Cyclophosphamide): 25 ml of sample stock solution and 5.0 ml of internal control solution (precisely weighed 185 mg of ethyl p-hydroxybenzoate control is dissolved in 1000 ml volumetric flask, to which is added 250 ml of ethanol. After shaking for dissolution, pure water is used to meter to calibration with shaking) are added to 50 ml volumetric flask, which is metered with pure water to calibration with shaking and then used for HPLC analysis.

HPLC Analysis Parameters:

| | |
|---|---|
| Chromatographic column | Waters μBondpak C18, 3.9 mm × 300 mm, 10 μm |
| Mobile phase | Acetonitrile:water = 30:70 (v/v) |
| Detecting wavelength | 195 nm |
| Column temperature | 25° C. |
| Flow rate | 1.5 ml/min |
| Injection volume | 25 μL |
| Working time | 15 min |

Redissolving time determination: 25 ml of 0.9% sodium chloride solution is added to penicillin bottle with sample (hydrated CPP freeze-dried composition in 500 mg strength), or 100 ml of 0.9% sodium chloride solution is added to penicillin bottle with sample (hydrated CPP freeze-dried composition in 2 g strength), and the penicillin bottle is shaken by hand for complete dissolution of the sample. The redissolving time is observed and recorded.

Example 1: Preparation of Various Aqueous Solutions

1. Preparation of Various Sodium Bromide Solutions 29.5 g and 68.9 g of sodium bromide were placed in beakers with 100 ml of purified water, which were stirred under room temperature to clear to give sodium bromide solutions with saturation of 30% and 70%, respectively.

2. Preparation of Various Sodium Chloride Solutions 10.8 g and 25.3 g of sodium chloride were placed in beakers with 100 ml of purified water, which were stirred under room temperature to clear to give sodium chloride solutions with saturation of 30% and 70%, respectively.

34 g of sodium chloride was weighed in a beaker with 100 ml of purified water, which was stirred under room temperature to clear. 12 g of sodium chloride was then added with stirring to give sodium chloride solution with saturation of 100%.

3. Preparation of Various Potassium Chloride Solutions 11.2 g and 26.0 g of potassium chloride were placed in beakers with 100 ml of purified water, which were stirred under room temperature to clear to give potassium chloride solutions with saturation of 30% and 70%, respectively.

40 g of potassium chloride was weighed in a beaker with 100 ml of purified water, which was heated to 60° C. and stirred to clear and cooled to room temperature. 8 g of potassium chloride was then added with stirring to give potassium chloride solution with saturation of 100%.

4. Preparation of Various Potassium Sulfate Solutions 3.9 g and 9.1 g of potassium sulfate were placed in beakers with 100 ml of purified water, which were stirred under room temperature to clear to give potassium sulfate solutions with saturation of 30% and 70%, respectively.

15 g of potassium sulfate was placed in a beaker with 100 ml of purified water, which was heated to 60° C. and stirred to clear and cooled to room temperature. 5 g of potassium sulfate was then added with stirring to give potassium sulfate solution with saturation of 100%.

5. Preparation of Various Surfactant Solutions 1 g and 5 g of sodium dodecyl sulfate (SDS) were placed in beakers with 100 ml of purified water, which were stirred under room temperature to clear to give SDS solutions with concentrations of 1% and 5%, respectively.

1 g and 5 g of Tween 80 were placed in beakers with 100 ml of purified water, which were stirred under room temperature to clear to give Tween 80 solutions with concentrations of 1% and 5%, respectively.

6. Preparation of Various Glycerol Solutions 30 g of glycerol was placed in a beaker with 70 g of purified water, which was stirred under room temperature to clear to give glycerol solution with concentration of 30% w/w.

40 g of glycerol was placed in a beaker with 60 g of purified water, which was stirred under room temperature to clear to give glycerol solution with concentration of 40% w/w.

50 g of glycerol was placed in a beaker with 50 g of purified water, which was stirred under room temperature to clear to give glycerol solution with concentration of 50% w/w.

7. Preparation of Saturated Mannitol Solution 18 g of mannitol was placed in a beaker with 100 ml of purified water, which was stirred under room temperature to clear. 5 g of mannitol was then added with stirring to give saturated mannitol solution.

The above aqueous solutions with different saturation or concentration and purified water were placed on the shelf of dryer which was closed (i.e., 0 h). Relative humidity in the dryer was recorded every 30 min and the results were shown in Table 1-1.

The results showed that aqueous solutions with different saturation or concentration and purified water can provide relative humidity of 50% RH or more after 0.5 h in the dryer. Various levels of relative humidity can be achieved by changing the types of aqueous solutions or changing the saturation or concentration of solute in the aqueous solutions.

TABLE 1-1

Relative humidity in dryer

| time/h | 30% saturation NaBr solution | 70% saturation NaBr solution | 30% saturation NaCl solution | 70% saturation NaCl solution | 100% saturation NaCl solution | 30% saturation KCl solution | 70% saturation KCl solution | 100% saturation KCl solution | 30% saturation $K_2SO_4$ solution | 70% saturation $K_2SO_4$ solution |
|---|---|---|---|---|---|---|---|---|---|---|
| 0 | 33.2 | 29.9 | 47.3 | 39.5 | 38.4 | 43.0 | 38.4 | 35.5 | 30.0 | 35.5 |
| 0.5 | 82.1 | 69.7 | 85.8 | 71.1 | 55.6 | 86.1 | 72.9 | 70.9 | 74.8 | 89.1 |
| 1.0 | 85.2 | 72.2 | 89.5 | 77.4 | 61.5 | 91.0 | 80.6 | 75.7 | 77.6 | 91.5 |
| 1.5 | 87.1 | 73.3 | 91.5 | 80.6 | 64.1 | 92.8 | 82.4 | 77.4 | 81.3 | 93.2 |
| 2.0 | 88.0 | 74.1 | 92.8 | 82.8 | 65.6 | 94.1 | 83.7 | 78.3 | 84.3 | 93.6 |
| 2.5 | 88.9 | 74.1 | 93.6 | 83.7 | 67.8 | 94.9 | 84.1 | 78.7 | 86.5 | 94.1 |
| 3.0 | 89.3 | 74.6 | 94.1 | 85.0 | 69.5 | 94.9 | 84.5 | 79.6 | 88.2 | 94.1 |
| 3.5 | 89.7 | 74.6 | 94.9 | 85.4 | 70.3 | 95.8 | 85.0 | 80.4 | 89.1 | 94.9 |
| 4.0 | 90.2 | 74.6 | 95.4 | 86.3 | 71.0 | 95.8 | 85.4 | 81.2 | 89.5 | 94.9 |
| 4.5 | 90.6 | 74.6 | 95.8 | 86.3 | 71.4 | 95.8 | 85.4 | 81.9 | 89.9 | 94.9 |
| 5.0 | 90.6 | 74.6 | 95.8 | 87.1 | 71.8 | 96.2 | 85.8 | 82.3 | 90.4 | 95.4 |
| 5.5 | 91.0 | 74.6 | 96.2 | 87.1 | 72.3 | 96.7 | 85.8 | 82.8 | 90.8 | 95.8 |
| 6.0 | 91.0 | 74.6 | 96.7 | 87.1 | 72.6 | 96.7 | 86.3 | 83.6 | 91.3 | 95.8 |
| 6.5 | 91.5 | 74.6 | 96.7 | 87.1 | 72.6 | 96.7 | 86.3 | 83.6 | 91.8 | 95.8 |
| 7.0 | 91.5 | 74.6 | 96.7 | 87.6 | 72.9 | 96.7 | 86.3 | 84.1 | 92.2 | 95.8 |
| 7.5 | 91.5 | 74.6 | 96.7 | 87.6 | 73.4 | 96.7 | 86.3 | 84.5 | 92.6 | 95.8 |
| 8.0 | 91.5 | 74.6 | 97.1 | 88.0 | 73.4 | 96.7 | 86.7 | 84.5 | 92.6 | 95.8 |
| 8.5 | 91.5 | 74.1 | 97.5 | 88.0 | 73.8 | 97.1 | 86.7 | 84.5 | 92.6 | 95.8 |
| 9.0 | 91.5 | 74.1 | 97.5 | 88.0 | 73.6 | 97.1 | 87.1 | 84.5 | 93.1 | 95.8 |
| 9.5 | 91.9 | 74.1 | 97.5 | 88.0 | 74.0 | 97.1 | 87.1 | 84.9 | 93.5 | 95.8 |
| 10.0 | 91.9 | 74.1 | 97.5 | 88.0 | 74.0 | 97.1 | 87.1 | 84.6 | 93.5 | 95.8 |
| 10.5 | 91.9 | 74.1 | 97.5 | 88.0 | 74.5 | 97.5 | 87.1 | 84.6 | 93.5 | 95.8 |

TABLE 1-1-continued

Relative humidity in dryer

RH (%)

| | | | | | | | | | |
|---|---|---|---|---|---|---|---|---|---|
| 11.0 | 91.9 | 74.1 | 97.5 | 88.0 | 74.5 | 97.5 | 87.6 | 85.1 | 93.9 | 95.8 |
| 11.5 | 91.9 | 74.1 | 97.5 | 88.0 | 74.5 | 97.5 | 87.6 | 85.1 | 93.9 | 95.8 |
| 12.0 | 92.3 | 74.1 | 97.5 | 88.0 | 74.5 | 97.5 | 87.6 | 85.1 | 94.4 | 95.8 |

| time/h | 1% SDS solution | 5% SDS solution | 1% Tween 80 solution | 5% Tween 80 solution | 30% glycerol solution | 40% glycerol solution | 50% glycerol solution | 100% saturation mannitol solution | pure water |
|---|---|---|---|---|---|---|---|---|---|
| 0 | 26.9 | 62.0 | 29.1 | 52.0 | 62.0 | 63.0 | 62.6 | 86.4 | 30.2 |
| 0.5 | 79.8 | 96.1 | 81.1 | 85.4 | 75.6 | 80.8 | 75.4 | 90.5 | 94.4 |
| 1.0 | 79.6 | 96.2 | 81.9 | 87.8 | 77.6 | 82.8 | 76.3 | 91.2 | 95.5 |
| 1.5 | 80.2 | 95.9 | 82.4 | 89.3 | 78.3 | 84.3 | 76.7 | 91.6 | 95.5 |
| 2.0 | 80.6 | 95.5 | 82.8 | 91.0 | 80.0 | 85.2 | 77.2 | 92.0 | 95.9 |
| 2.5 | 81.1 | 95.8 | 83.4 | 92.3 | 80.4 | 86.1 | 77.6 | 92.0 | 96.4 |
| 3.0 | 81.1 | 96.2 | 83.9 | 93.2 | 80.9 | 86.9 | 78.0 | 92.9 | 96.7 |
| 3.5 | 81.5 | 96.7 | 83.9 | 93.2 | 81.7 | 87.4 | 78.5 | 92.9 | 96.7 |
| 4.0 | 81.9 | 96.7 | 84.3 | 94.1 | 82.2 | 87.8 | 78.5 | 92.9 | 96.7 |
| 4.5 | 81.9 | 96.7 | 84.7 | 94.1 | 82.6 | 88.2 | 78.9 | 93.3 | 96.7 |
| 5.0 | 81.9 | 96.7 | 84.7 | 94.5 | 83.0 | 88.7 | 79.3 | 93.3 | 97.1 |
| 5.5 | 82.4 | 96.7 | 84.7 | 94.9 | 83.5 | 88.7 | 79.3 | 93.8 | 97.1 |
| 6.0 | 82.4 | 97.1 | 85.2 | 94.9 | 83.5 | 89.1 | 79.3 | 93.8 | 97.5 |
| 6.5 | 82.4 | 97.1 | 85.2 | 95.4 | 83.9 | 89.1 | 79.8 | 93.8 | 97.5 |
| 7.0 | 82.8 | 97.1 | 85.6 | 95.4 | 84.3 | 89.5 | 79.8 | 93.8 | 97.5 |
| 7.5 | 82.8 | 97.5 | 85.6 | 95.8 | 84.3 | 89.5 | 79.8 | 93.8 | 97.5 |
| 8.0 | 82.8 | 97.5 | 85.6 | 95.8 | 84.3 | 89.5 | 80.2 | 93.8 | 97.5 |
| 8.5 | 82.8 | 97.5 | 86.0 | 95.8 | 84.8 | 90.0 | 80.2 | 94.2 | 97.5 |
| 9.0 | 83.2 | 97.5 | 86.0 | 95.8 | 85.2 | 90.0 | 80.2 | 94.2 | 97.5 |
| 9.5 | 83.2 | 97.5 | 86.5 | 95.8 | 85.2 | 90.4 | 80.2 | 94.2 | 97.5 |
| 10.0 | 83.2 | 97.5 | 86.5 | 96.2 | 85.2 | 90.4 | 80.2 | 94.6 | 97.5 |
| 10.5 | 83.7 | 97.5 | 86.5 | 96.2 | 85.6 | 90.4 | 80.6 | 94.6 | 98.0 |
| 11.0 | 83.7 | 97.5 | 86.5 | 96.7 | 85.6 | 90.4 | 80.6 | 94.6 | 98.0 |
| 11.5 | 83.7 | 97.5 | 86.5 | 96.7 | 86.1 | 90.4 | 80.6 | 94.6 | 98.0 |
| 12.0 | 83.7 | 97.5 | 86.5 | 96.7 | 86.1 | 90.7 | 81.1 | 94.6 | 98.0 |

Example 2: Preparation and Introduction of Sodium Chloride Solution of 70% Saturation 1. Preparation of Sodium Chloride Solution of 70% Saturation 12 kg of purified water was placed in a stainless steel bucket and 3.04 kg of sodium chloride was weighed and added into water with stirring for dissolution to clear so as to give 25.3% (w/v) sodium chloride solution (i.e. sodium chloride solution of about 70% saturation).

2. Introduction of Sodium Chloride Solution of 70% Saturation and Relative Humidity The sodium chloride solution of 70% saturation was sterilized with high pressure steaming sterilizer (121° C., about 15 min) and divided into 16 stainless steel trays (tray size: 300 mm×220 mm×50 mm). In A level clean area, the front door of freeze-drying box (model DG-2010BSCSIP/CIP, Shanghai Gonghe Vacuum Sci &Tech Co., Ltd.) was opened, the stainless steel trays with the sodium chloride solution of 70% saturation were pushed to 9th baffle of the freeze-drying machine (baffle size 1200 mm×900 mm) and the front door of the freeze-drying box was closed. The temperature of the baffle was maintained as about 25° C., vacuum of about 60 kPa was applied and the septum valve was closed. The change of relative humidity over time of front box of freeze-drying machine was recorded and the results were shown in Table 2-1.

TABLE 2-1

Relative humidity of sodium chloride solution of 70% saturation in freeze-drying box (25° C., about 60 kPa)

| Time point (h) | RH % |
|---|---|
| 0 | 45.8 |
| 0.5 | 60.7 |
| 1.0 | 67.2 |
| 1.5 | 72.0 |
| 2.0 | 74.6 |
| 2.5 | 76.8 |
| 3.0 | 77.6 |
| 3.5 | 78.9 |
| 4.0 | 79.4 |
| 4.5 | 79.8 |
| 5.0 | 80.2 |
| 5.5 | 80.2 |
| 6.0 | 80.2 |
| 6.5 | 80.2 |
| 7.0 | 80.2 |
| 7.5 | 80.7 |
| 8.0 | 80.2 |
| 8.5 | 80.2 |
| 9.0 | 80.2 |
| 9.5 | 80.7 |
| 10.0 | 80.2 |
| 10.5 | 80.7 |
| 11.0 | 80.2 |
| 11.5 | 80.7 |
| 12.0 | 80.7 |

It can be seen from Table 2-1, relative humidity of 75-85% RH was produced when sodium chloride solution of 70% saturation was placed in the freeze-drying box (25° C., about 60 kPa) for about 2 h, which could provide sufficiently stable relative humidity environment for hydration.

Example 3: Hydration of Freeze-Dried Composition with Saturated Sodium Bromide Solution (Relative Humidity is 60% RH Under Room Temperature)

1. Procedures

Preparation of saturated sodium bromide solution: 520 g of purified water was weighed in a beaker, which was heated to 40° C. and 520 g of sodium bromide was added with stirring for complete dissolution.

The system was cooled to room temperature and 156 g of sodium bromide was added with stirring to give sodium bromide saturated solution.

CPP freeze-dried composition was prepared and hydrated according to the following procedures.
1) 375 g of mannitol was weighed in 15 kg of water for injection and 534.5 g of CPP monohydrate was added with stirring for dissolution. Sterilization was performed with 0.22 μm filtration membrane and the solution was divided into 30 cc or 50 cc penicillin bottles (Schott) as 15.91 g/bottle with half stopper (butyl bromide rubber stopper, West).
2) The penicillin bottles with half stopper were put on the shelf of the freeze-drying box (model LYO-0.5, Shanghai Tofflon Sci &Tech Co., Ltd.) and the freeze-drying machine was turned on. The temperature of the shelf is lowered to −30° C. in 1 h and maintained for 7 h.
3) The vacuum was applied. When the vacuum reached 90 Pa, the shelf was heated allowing the shelf temperature to reach 3° C. in 1 h and maintain for about 28 h. The shelf was heated to allow the shelf temperature to reach 25° C. in 1 hand maintain for about 10 h. The CPP freeze-dried composition was obtained when the freeze-drying procedure was over.
4) The saturated sodium bromide solution was placed in the dryer and allowed to stand for 24 h. CPP freeze-dried composition was taken from the freeze-drying box, subjected to half stopper, and put into the dryer. The penicillin bottles with hydrated CPP freeze-dried compositions were stoppered at 8 h, 16 h and 40 h, respectively. The bottles were taken out and provided with aluminum plastic compound cap to give the hydrated CPP freeze-dried compositions in 500 mg strength.

2. Assessment of the Properties of Hydrated Freeze-Dried Composition

1) Appearance

In the dryer, the CPP freeze-dried compositions hydrated with saturated sodium bromide solution in penicillin bottles showed homogenous and plump state.

2) Physicochemical Property

The moisture content, CPP content and redissolving time were determined for CPP freeze-dried composition hydrated with saturated sodium bromide solution. The results were shown in Table 3-1.

TABLE 3-1

Physicochemical properties of hydrated CPP freeze-dried composition

| Hydrating time (h) | Moisture content %[1] | Moisture content %[2] | Redissolving time (min) | CPP content % |
|---|---|---|---|---|
| 0 | 2.1 | 3.6 | 9.5 | 103.1 |
| 8 | 4.1 | 7.0 | 1.2 | 100.3 |
| 16 | 4.0 | 6.8 | 1.2 | 96.1 |
| 40 | 4.0 | 6.6 | 1.7 | 103.2 |

[1]moisture content % calculated based on freeze-dried composition.
[2]moisture content % calculated based on CPP monohydrate.

It can be seen from Table 3-1, the CPP freeze-dried compositions hydrated with saturated sodium bromide solution for 8 h and 16 h showed satisfactory appearance, moisture content, CPP content and redissolving time.

Example 4: Hydration of Freeze-Dried Composition with Saturated Sodium Chloride Solution (Relative Humidity is 75% RH Under Room Temperature)

1. Procedures

Preparation of saturated sodium chloride solution: 520 g of purified water was weighed in a beaker, to which was added 187.2 g of sodium chloride with stirring for complete dissolution. 57 g of sodium chloride was then added with stirring to give sodium chloride saturated solution.

CPP freeze-dried composition was obtained according to the procedures in 1)-3) of Example 3.

Hydration was performed according to the following procedures.
4) The inlet valve was opened to allow sterile air to come into the freeze-drying box. The vacuum state was released, and the inlet valve was closed.

The front door of freeze-drying box (model LYO-0.5, Shanghai Tofflon Sci &Tech Co., Ltd.) was opened, the steaming sterilized saturated sodium chloride solution was placed in the sterile tray on the bottom shelf (shelf 4) and the front door was locked. The penicillin bottles with hydrated CPP freeze-dried compositions were taken out at 16 h and 24 h and provided with aluminum plastic compound cap to give hydrated CPP freeze-dried composition in 500 mg strength, respectively.

Alternatively, 4') the saturated sodium chloride solution was placed in the dryer and allowed to stand for 24 h. The CPP freeze-dried composition was taken out from the freeze-drying box, half stoppered and put into the dryer. The penicillin bottles with hydrated CPP freeze-dried compositions were stoppered at 8 h, 16 h and 40 h, taken out and provided with aluminum plastic compound cap to give hydrated CPP freeze-dried compositions in 500 mg strength, respectively.

2. Assessment of the Properties of Hydrated Freeze-Dried Composition

1) Appearance

In the freeze-drying box and dryer, the CPP freeze-dried compositions hydrated with saturated sodium chloride solution in penicillin bottles showed homogenous and plump state.

2) Physicochemical Property

The moisture content, CPP content and redissolving time were determined for CPP freeze-dried composition hydrated with saturated sodium chloride solution in the freeze-drying box, respectively. In addition, the CPP freeze-dried compositions hydrated for 16 h and 24 h were placed in 45° C. oven and sampled for determining CPP contents after 1 week and 2 weeks, respectively. The results were shown in Table 4-1.

TABLE 4-1

Physicochemical properties of hydrated CPP freeze-dried composition

| Hydrating time | | Moisture Content %[1] | Moisture content %[2] | CPP content % | Redissolving time (min) | Stability-CPP content % | |
|---|---|---|---|---|---|---|---|
| | | | | | | 45° C.- 1 week | 45° C.- 3 weeks |
| 0 h | | 2.1 | 3.6 | 102.9 | / | 72.0 | 30.5 |
| 16 h | shelf 1 | 4.2 | 7.1 | 102.0 | 1.75 | 100.5 | 99.8 |
| | shelf 3 | 5.1 | 8.7 | 102.2 | 1.76 | 101.5 | 100.2 |
| 24 h | shelf 1 | 4.7 | 8.0 | 102.5 | 1.77 | 101.4 | 98.7 |
| | shelf 3 | 4.9 | 8.3 | 102.6 | 1.70 | 99.4 | 100.3 |

[1]moisture content % calculated based on freeze-dried composition.
[2]moisture content % calculated based on CPP monohydrate.

Moisture content, CPP content and redissolving time were determined for CPP freeze-dried composition hydrated with saturated sodium chloride solution in the dryer, respectively. In addition, the CPP freeze-dried composition hydrated for 16 h was placed in 45° C. oven, sampled after 1 week and 2 weeks, respectively and determined for CPP contents. The CPP freeze-dried composition hydrated for 16 h was placed in 40° C./75% RH stability test chamber, was sampled after 1 month and 3 months, and determined for CPP contents, which were compared with CPP monohydrate obtained by prior art hydrating process. The results were shown in Table 4-2.

TABLE 4-2

Physicochemical properties of hydrated CPP freeze-dried composition

| Sample | Hydrating time (h) | Moisture content %[1] | Redissolving time (min) | CPP content % | Stability-CPP content % | | | |
|---|---|---|---|---|---|---|---|---|
| | | | | | 45° C.- 1 week | 45° C.- 2 weeks | 40° C./75% RH-1 month | 40° C./75% RH-3 months |
| CPP freeze-dried composition | 0 | 3.6 | 9.5 | 103.1 | / | / | / | / |
| | 8 | 7.3 | 1.2 | 102.8 | / | / | / | / |
| | 16 | 7.3 | 1.7 | 100.4 | 103.8 | 101.4 | 101.1 | 91.6 |
| | 40 | 7.8 | 1.5 | 103.3 | / | / | / | / |
| CPP monohydrate raw material | / | / | / | 99.6 | 106.1 | 101.8 | 98.9 | 86.1 |
| CPP freeze-dried composition[2] | / | / | / | / | 94 | 76 | / | / |

[1]moisture content % calculated based on CPP monohydrate.
[2]data obtained from U.S. Pat. No. 4,537,883.

It can be seen from Table 4-1, the CPP freeze-dried composition without hydration of saturated sodium chloride solution had the moisture content of 3.6% and was not stable at 45° C. environment for 1 week. On the contrary, the CPP freeze-dried composition hydrated with saturated sodium chloride solution in freeze-drying box had satisfactory moisture content, CPP content and redissolving time. Even placed at 45° C. environment for 3 weeks, the CPP content was no less than 99%, showing excellent stability. In addition, when hydrating CPP freeze-dried composition with saturated sodium chloride solution in the freeze-drying box, hydrations for 16 h and 24 h can both obtain hydrated CPP freeze-dried composition with good properties. Moreover, no matter where the saturated sodium chloride solution was placed in the freeze-drying box shelf, it can provide stable hydrating environment, thereby obtaining satisfactory hydrated CPP freeze-dried composition.

It can be seen from Table 4-2, the CPP freeze-dried composition without hydration of saturated sodium chloride solution has the redissolving time of 9.5 min, which was unsatisfactory. And it can be seen from Table 4-1, the CPP freeze-dried composition without hydration had the moisture content of 3.6% and was not stable at 45° C. environment for 1 week. In contrast, the CPP freeze-dried composition hydrated with saturated sodium chloride solution in the dryer had satisfactory moisture content, CPP content and redissolving time. Particularly, the CPP freeze-dried composition hydrated for 16 h was stable at 45° C. environment for 2 weeks and was very stable at extreme rigor environment (40° C./75% RH) for 1 month and 3 months. Moreover, the stability at such environment was even better than the active ingredient CPP monohydrate.

In addition, when the freeze-dried composition containing CPP and mannitol was hydrated according to the process disclosed in U.S. Pat. No. 4,537,883 (column 8, Table 4 of the specification), the CPP contents were 94% and 76% after being placed at 45° C. for 1 week and 2 weeks, respectively. In contrast, in the present invention, the CPP freeze-dried composition hydrated with saturated sodium chloride solution, either in the freeze-drying box or in the dryer, had CPP contents over 98% after being placed at 45° C. for 1 week, 2 weeks or 3 weeks, indicating better stability of the CPP freeze-dried composition hydrated with saturated sodium chloride solution according to the invention.

Example 5: Hydration of Freeze-Dried Composition with Saturated Potassium Chloride Solution (Relative Humidity is 85% RH Under Room Temperature)

1. Procedures

Preparation of saturated potassium chloride solution: 100 g of purified water was weighed in a beaker, to which was added 45 g of potassium chloride. The system was heated to 70° C. with stirring. When the solution was clear, heating was stopped, and the solution was cooled to room temperature to give the saturated potassium chloride solution.

The CPP freeze-dried composition was obtained according to procedures in 1)-3) of Example 3.

The hydration was performed as follows. The inlet valve was opened to allow sterile air to come into the freeze-drying box. The vacuum state was released, and the inlet valve was closed. The front door of the freeze-drying box was opened, the steaming sterilized saturated potassium chloride solution was placed in the sterile tray on the bottom shelf and the front door was locked. The penicillin bottles with hydrated CPP freeze-dried compositions were stoppered at 8 h, 12 h and 16 h, taken out and provided with aluminum plastic compound cap to give hydrated CPP freeze-dried compositions in 500 mg strength, respectively.

2. Assessment of the Properties of Hydrated Freeze-Dried Composition

1) Appearance

In the freeze-drying box, the CPP freeze-dried composition hydrated with saturated potassium chloride solution in penicillin bottles showed homogenous and plump state.

2) Physicochemical Property

The moisture content, CPP content and redissolving time were determined for CPP freeze-dried composition hydrated with saturated potassium chloride solution in the freeze-drying box, respectively. The results were shown in Table 5-1.

TABLE 5-1

Physicochemical properties of hydrated CPP freeze-dried composition

| Hydrating time (h) | Moisture content %[1] | Redissolving time (min) | CPP content % | Stability-CPP content % | |
|---|---|---|---|---|---|
| | | | | 45° C.-1 week | 45° C.-2 weeks |
| 0 | 1.9 | 2.08 | 97.3 | / | / |
| 16 | 6.1 | 1.45 | 101.8 | / | / |
| 24 | 6.8 | 1.85 | 98.9 | 101.6 | 99.8 |

[1]moisture content % calculated based on the weight of CPP monohydrate.

It can be seen from Table 5-1, the CPP freeze-dried composition without hydration of saturated potassium chloride solution had the moisture content of 1.9% and was not stable. On the contrary, the CPP freeze-dried composition hydrated with saturated potassium chloride solution in the freeze-drying box had satisfactory moisture content, CPP content and redissolving time. Moreover, the CPP freeze-dried composition hydrated with saturated potassium chloride solution for 24 h was stable at 45° C. environment for 2 weeks.

Example 6: Hydration of Freeze-Dried Composition with Saturated Potassium Sulfate Solution (Relative Humidity is 98% RH Under Room Temperature)

1. Procedures

Preparation of saturated potassium sulfate solution: 70 g of potassium sulfate was weighed in 520 ml of water, which was heated to 40° C. for dissolution. When the solution turned clear the container was placed in cool water. 40 g of potassium sulfate was then added to give saturated potassium sulfate solution.

The CPP freeze-dried composition was obtained according to procedures in 1)-3) of Example 3.

The hydration was performed as follows. The saturated potassium sulfate solution was placed in the dryer and was allowed to stand for 24 h. The CPP freeze-dried composition was half stoppered and placed in the dryer. The penicillin bottles with hydrated CPP freeze-dried composition were stoppered at 8 h, 16 h and 40 h, taken out and provided with aluminum plastic compound cap to give hydrated CPP freeze-dried composition in 500 mg strength, respectively.

2. Assessment of the Properties of Hydrated Freeze-Dried Composition

1) Appearance

In the freeze-drying box, the CPP freeze-dried compositions hydrated with saturated potassium sulfate solution in penicillin bottle showed homogenous and plump state.

2) Physicochemical Property

The moisture content, CPP content and redissolving time were determined for CPP freeze-dried composition hydrated with saturated potassium sulfate solution in the dryer, respectively. In addition, the CPP freeze-dried composition hydrated for 16 h was placed in 45° C. oven and was sampled for determining CPP contents after 1 week and 2 weeks, respectively. The CPP freeze-dried composition hydrated for 16 h was placed in 40° C./75% RH stability test chamber, sampled after 1 month and 3 months for determining CPP contents. The results were shown in Table 6-1.

TABLE 6-1

Physicochemical properties of hydrated CPP freeze-dried composition

| Hydrating time (h) | Moisture content %[1] | Redissolving time (min) | CPP content % | Stability-CPP content % | | | |
|---|---|---|---|---|---|---|---|
| | | | | 45° C.-1 week | 45° C.-2 weeks | 40° C./75% RH-1 month | 40° C./75% RH-3 months |
| 0 | 3.6 | 9.5 | 103.1 | / | / | / | / |
| 8 | 7.8 | 1.4 | 100.5 | / | / | / | / |

TABLE 6-1-continued

Physicochemical properties of hydrated CPP freeze-dried composition

| Hydrating time (h) | Moisture content %[1] | Redissolving time (min) | CPP content % | Stability-CPP content % | | | |
|---|---|---|---|---|---|---|---|
| | | | | 45° C.-1 week | 45° C.-2 weeks | 40° C./75% RH-1 month | 40° C./75% RH-3 months |
| 16 | 7.7 | 1.5 | 91.5 | 103.6 | 101.2 | 101.7 | 99.3 |
| 40 | 7.7 | 3.5 | 103.2 | / | / | / | / |

[1]moisture content % calculated based on CPP monohydrate.

It can be seen from Table 6-1, the CPP freeze-dried composition hydrated with saturated potassium sulfate solution in the dryer had satisfactory moisture content, CPP content and redissolving time. Moreover, the CPP freeze-dried composition hydrated for 16 h was stable at 45° C. environment for 2 weeks and was very stable at extreme rigor environment (40° C./75% RH) for 1 month and 3 months. In addition, the stability at such environment was even better than the active ingredient CPP monohydrate.

Example 7: Hydration of Freeze-Dried Composition with Pure Water (Relative Humidity is 100% RH Under Room Temperature)

1. Procedures

The CPP freeze-dried composition was prepared and hydrated according to the following procedures.
   1) 180 g of mannitol was weighed in 7.2 kg of water for injection and 257 g of CPP monohydrate was added with stirring for dissolution. Sterilization was performed with 0.22 μm filtration membrane and the solution was divided into 100 cc penicillin bottles (Schott) as 63.64 g/bottle with half stopper (butyl bromide rubber stopper, West).
   2) The penicillin bottles with half stopper were put on the shelf of the freeze-drying box (model LYO-0.5, Shanghai Tofflon Sci &Tech Co., Ltd.) and the freeze-drying machine was turned on. The temperature of the shelf was lowered to 0° C. at a rate of 1° C./min and maintained for 2 h. The temperature of the shelf is lowered to −40° C. at a rate of 1° C./min and maintained for 7 h.
   3) The temperature of the shelf was raised to 4° C. at a rate of 0.5° C./min and maintained for about 61 h. The temperature of the shelf is raised to 25° C. at a rate of 0.5° C./min and maintained for about 15 h. The freeze-drying procedures were completed and the CPP freeze-dried composition was obtained.
   4) The inlet valve of the freeze-drying box was opened to allow sterile air to come into the freeze-drying box. The vacuum state was released, and the inlet valve was closed. The front door of freeze-drying box (model LYO-0.5, Shanghai Tofflon Sci &Tech Co., Ltd.) was opened, the steaming sterilized pure water was placed in the sterile tray on the bottom shelf and the front door was locked. The penicillin bottles with hydrated CPP freeze-dried compositions were stoppered at 24 h, 48 h and 72 h, taken out and provided with aluminum plastic compound cap to give hydrated CPP freeze-dried composition in 2 g strength, respectively.
   Alternatively, 4') The inlet valve of the freeze-drying box was opened to allow sterile air to come into freeze-drying box. The vacuum state was released, and the inlet valve was closed. The front door of freeze-drying box (model LYO-0.5, Shanghai Tofflon Sci &Tech Co., Ltd.) was opened, the steaming sterilized pure water was placed in the sterile tray on the bottom shelf and the front door was locked. Vacuum was applied to prechamber of the freeze-drying box under room temperature until the pressure was about 60 kPa. The septum valve was closed and the hydration was initiated. The penicillin bottles with hydrated CPP freeze-dried compositions were stoppered at 24 h, taken out and provided with aluminum plastic compound cap to give hydrated CPP freeze-dried composition in 2 g strength.

2. Assessment of the Properties of Hydrated Freeze-Dried Composition

1) Appearance

In the freeze-drying box, the CPP freeze-dried compositions hydrated with pure water under normal atmosphere and micro negative pressure in penicillin bottles showed homogenous and plump state.

2) Physicochemical Property

The moisture content, CPP content and redissolving time were determined for CPP freeze-dried composition hydrated with pure water under normal atmosphere and micro negative pressure in freeze-drying box. The results were shown in Table 7-1.

TABLE 7-1

Physicochemical properties of hydrated CPP freeze-dried composition

| Condition | Hydrating time (h) | Moisture content %[1] | Moisture content %[2] | Redissolving time (min) | CPP content % |
|---|---|---|---|---|---|
| Normal atmosphere | 0 | 1.2 | 2.0 | 5.5 | / |
| | 24 | 1.5 | 2.6 | / | / |
| | 48 | 3.3 | 5.6 | / | / |
| | 72 | 3.8 | 6.5 | 3.4 | 100.5 |
| Micro negative pressure | 0 | 1.9 | 3.2 | 8.7 | 101.2 |
| | 24 | 4.1 | 7.0 | 4.2 | 99.1 |

[1]moisture content % calculated based on the weight of freeze-dried composition.
[2]moisture content % calculated based on the weight of CPP monohydrate.

It can be seen from Table 7-1, it took at least 72 h for hydrating the freeze-dried composition in 2 g strength with pure water under normal atmosphere to achieve satisfactory moisture content, while under micro negative pressure, it took only 24 h to achieve satisfactory moisture content.

Example 8: Hydration of Freeze-Dried Composition with Pure Water (Relative Humidity is 100% RH Under Room Temperature)

1. Procedures

The CPP freeze-dried composition was obtained according to procedures in 1)-3) of Example 3.

The hydration was performed as follows.
   4) The inlet valve was opened to allow sterile air to come into the freeze-drying box. The vacuum state was released, and the inlet valve was closed. The front door of the freeze-drying box was opened, the steaming sterilized pure water was placed in the sterile tray on the bottom shelf and the front door was locked. The penicillin bottles with hydrated CPP freeze-dried compositions were stoppered at 16 h and 24 h, taken out and provided with aluminum plastic compound cap to give hydrated CPP freeze-dried composition in 500 mg strength, respectively.

Alternatively, 4') The above obtained CPP freeze-dried composition was transferred to industrial freeze-drying box (model: DG-2010BSCSIP/CIP, Shanghai Gonghe Vacuum Sci &Tech Co., Ltd.). The front door of the freeze-drying box was opened, the steaming sterilized pure water (about 36 L) was placed on the bottom of the freeze-drying box (solution surface area: about 2.5 m$^2$) and the front door was locked. The temperature was set to be 25° C. Vacuum was applied to prechamber of the freeze-drying box until the pressure was 60 kPa. The septum valve was closed and the hydration was initiated. The penicillin bottles with hydrated CPP freeze-dried compositions were stoppered at 15 h, taken out and provided with aluminum plastic compound cap to give hydrated CPP freeze-dried composition in 500 mg strength.

2. Assessment of the Properties of Hydrated Freeze-Dried Composition

1) Appearance

In the freeze-drying box, the CPP freeze-dried compositions hydrated with pure water under normal atmosphere and micro negative pressure in penicillin bottles showed homogenous and plump state.

2) Physicochemical Property

The moisture content, CPP content and redissolving time were determined for CPP freeze-dried composition hydrated with pure water under normal atmosphere and micro negative pressure in the freeze-drying box. The results were shown in Table 8-1.

Under micro negative pressure, the CPP freeze-dried composition without hydration of pure water had the moisture content of 2.9%, while the CPP freeze-dried composition hydrated with pure water had satisfactory moisture content and CPP content. Moreover, the CPP freeze-dried composition hydrated with pure water under micro negative pressure for 15 h was stable at 40° C./75% RH environment for 1 month. Therefore, with the hydrating process according to the invention, the CPP freeze-dried composition with significantly improved stability can be obtained.

Example 9: Hydration of Freeze-Dried Composition Under Micro Negative Pressure with Sodium Chloride Solution of 70% Saturation 1. Procedures In the freeze-drying box (model: LYO-0.5, Shanghai Tofflon Sci &Tech Co., Ltd.), the CPP freeze-dried composition was obtained according to procedures in 1)-3) of Example 3.

The hydration was performed as follows.

4) The inlet valve of freeze-drying box was opened to allow sterile air to come into freeze-drying box. The vacuum state was released, and the inlet valve was closed. The front door of the freeze-drying box was opened, the steaming sterilized sodium chloride solution of 70% saturation was placed in the sterile tray on the bottom shelf and the front door was locked. Vacuum was applied to prechamber of the freeze-drying box under room temperature until the pressure was about 60 kPa. The septum valve was closed and the hydration was initiated. The penicillin bottles with hydrated CPP freeze-dried compositions were stoppered at 15 h, taken out and provided with aluminum plastic compound cap to give hydrated CPP freeze-dried composition in 500 mg strength.

TABLE 8-1

Physicochemical properties of hydrated CPP freeze-dried composition

| Condition | Hydrating time(h) | Moisture content %[1] | Moisture content %[2] | Redissolving time (min) | CPP content % | Stability-CPP content % | | |
|---|---|---|---|---|---|---|---|---|
| | | | | | | 45° C. - 1 week | 45° C. - 2 weeks | 40° C./75% RH - 1 month |
| normal atmosphere | 0 | 1.2 | 1.9 | 2.08 | 97.3 | / | / | / |
| | 16 | 3.8 | 6.5 | 1.43 | 99.9 | 100.8 | 100.2 | / |
| | 24 | 4.0 | 6.8 | 1.67 | 97.8 | 100.2 | 99.3 | / |
| micro negative pressure | 0 | 1.7 | 2.9 | / | 99.8 | / | / | / |
| | 15 | 4.2 | 7.1 | / | 102.2 | / | / | 98.8 |

[1]moisture content % calculated based on the weight of freeze-dried composition.
[2]moisture content % calculated based on the weight of CPP monohydrate.

It can be seen from Table 8-1, the CPP freeze-dried composition without hydration of pure water under normal atmosphere had the moisture content of 1.9%, which was not stable and the redissolving time of 2.08 min. However, the CPP freeze-dried composition hydrated with pure water under normal atmosphere in the freeze-drying box had satisfactory moisture content, CPP content and redissolving time. Moreover, the CPP freeze-dried compositions hydrated with pure water for 16 and 24 h were stable at 45° C. environment for 2 weeks. Therefore, with the hydrating process according to the invention, the CPP freeze-dried composition with significantly improved stability can be obtained.

2. Assessment of the Properties of Hydrated Freeze-Dried Composition

1) Appearance

In the freeze-drying box, the CPP freeze-dried compositions in 500 mg strength hydrated with sodium chloride solution of 70% saturation under micro negative pressure in penicillin bottles showed homogenous and plump state.

2) Physicochemical Property

The moisture content, CPP content and stability were determined for CPP freeze-dried composition in 500 mg strength hydrated with sodium chloride solution of 70% saturation under micro negative pressure in the freeze-drying box and the results were shown in Table 9-1.

TABLE 9-1

Physicochemical properties of hydrated CPP freeze-dried composition

| Hydrating time (h) | Moisture content %[1] | Moisture content %[2] | CPP content % | Redissolving time (min) | Stability-CPP content % 40° C./75% RH-1 month |
|---|---|---|---|---|---|
| 0 | 1.7 | 2.9 | 99.8 | / | / |
| 15 | 4.1 | 7.0 | 100.9 | / | 96.9 |

[1]moisture content % calculated based on the weight of freeze-dried composition.
[2]moisture content % calculated based on the weight of CPP monohydrate.

It can be seen from Table 9-1, with respect to CPP freeze-dried composition, the moisture content without hydration was 2.9% while the CPP freeze-dried composition hydrated with sodium chloride solution of 70% saturation under micro negative pressure in the freeze-drying box had satisfactory moisture content, CPP content and stability. Moreover, the CPP freeze-dried composition hydrated with sodium chloride solution of 70% saturation under micro negative pressure in the freeze-drying box for 15 h was stable at 40° C./75% RH environment for 1 month. Therefore, with the hydrating process according to the invention, the CPP freeze-dried composition with significantly improved stability can be obtained.

Example 10.1: Hydration of Freeze-Dried Composition Under Micro Negative Pressure with 30% Glycerol Solution 1. Procedures In freeze-drying box (model: LYO-0.5, Shanghai Tofflon Sci &Tech Co., Ltd.), the CPP freeze-dried composition was obtained according to procedures in 1)-3) of Example 3.

The hydration was performed as follows.

4) The inlet valve of freeze-drying box was opened to allow sterile air to come into freeze-drying box. The vacuum state was released, and the inlet valve was closed. The front door of freeze-drying box was opened, the steaming sterilized 30% glycerol solution was placed in the sterile tray on the bottom shelf (tray surface area: 330 cm$^2$) and the front door was locked. Vacuum was applied to prechamber of the freeze-drying box under room temperature until the pressure was about 50 kPa. The septum valve was closed, and the hydration was initiated. The penicillin bottles with hydrated CPP freeze-dried compositions were stoppered at 8 h, taken out and provided with aluminum plastic compound cap to give hydrated CPP freeze-dried composition in 500 mg strength.

2. Assessment of the Properties of Hydrated Freeze-Dried Composition

1) Appearance

In the freeze-drying box, the CPP freeze-dried compositions in 500 mg strength hydrated with 30% glycerol solution under micro negative pressure in penicillin bottles showed homogenous and plump state.

2) Physicochemical Property

The moisture content was determined for CPP freeze-dried composition in 500 mg strength hydrated with 30% glycerol solution under micro negative pressure in freeze-drying box and the results were shown in Table 10-1.

TABLE 10-1

Physicochemical properties of hydrated CPP freeze-dried composition

| Hydrating time (h) | Moisture content %[1] | Moisture content %[2] |
|---|---|---|
| 0 | 1.2 | 2.0 |
| 8 | 4.0 | 6.8 |

[1]moisture content % calculated based on the weight of freeze-dried composition.
[2]moisture content % calculated based on the weight of CPP monohydrate.

It can be seen from Table 10-1, with respect to CPP freeze-dried composition, the moisture content without hydration was 2.0% while the CPP freeze-dried composition hydrated with 30% glycerol solution under micro negative pressure in the freeze-drying box had satisfactory moisture content. Therefore, with the hydrating process according to the invention, the CPP freeze-dried composition with significantly improved stability can be obtained.

Example 10.2: Hydration of Freeze-Dried Composition Under Micro Negative Pressure with 40% Glycerol Solution 1. Procedures In freeze-drying box (model: LYO-0.5, Shanghai Tofflon Sci &Tech Co., Ltd.), the CPP freeze-dried composition was obtained according to procedures in 1)-3) of Example 3.

The hydration was performed as follows.

4) The inlet valve of freeze-drying box was opened to allow sterile air to come into freeze-drying box. The vacuum state was released, and the inlet valve was closed. The front door of freeze-drying box was opened, the steaming sterilized 40% glycerol solution was placed in the sterile tray on the bottom shelf (tray surface area: 330 cm$^2$) and the front door was locked. Vacuum was applied to prechamber of the freeze-drying box under room temperature until the pressure was about 50 kPa. The septum valve was closed, and the hydration was initiated. The penicillin bottles with hydrated CPP freeze-dried compositions were stoppered at 20 h, taken out and provided with aluminum plastic compound cap to give hydrated CPP freeze-dried composition in 500 mg strength.

2. Assessment of the Properties of Hydrated Freeze-Dried Composition

1) Appearance

In the freeze-drying box, the CPP freeze-dried compositions in 500 mg strength hydrated with 40% glycerol solution under micro negative pressure in penicillin bottles showed homogenous and plump state.

2) Physicochemical Property

The moisture content was determined for CPP freeze-dried composition in 500 mg strength hydrated with 40% glycerol solution under micro negative pressure in freeze-drying box and the results were shown in Table below.

TABLE 10-2

Physicochemical properties of hydrated CPP freeze-dried composition

| Hydrating time (h) | Moisture content %[1] | Moisture content %[2] |
|---|---|---|
| 0 | 1.1 | 1.9 |
| 20 | 4.1 | 7.0 |

[1]moisture content % calculated based on the weight of freeze-dried composition.
[2]moisture content % calculated based on the weight of CPP monohydrate.

It can be seen from Table 10-2, with respect to CPP freeze-dried composition, the moisture content without hydration was 1.9% while the CPP freeze-dried composition hydrated with 40% glycerol solution under micro negative pressure in the freeze-drying box had satisfactory moisture content. Therefore, with the hydrating process according to the invention, the CPP freeze-dried composition with significantly improved stability can be obtained.

The following Examples were hydrated CPP freeze-dried composition prepared by hydrating with pure water, sodium chloride solution (70% saturation) or glycerol solution (40 wt %) respectively. The preparation methods can be referred to Example 8, 9 and 10 (10.2) respectively and can be adjusted according to the required strength.

Example 11: Bulk Density (BD or ρ0)

BD of the test sample (for example, active ingredient CPP, the hydrated CPP freeze-dried composition) is measured in a Graduated Cylinder as per the Method I described in USP <616>. BD is calculated by the following formula:

$$BD\ (g/mL) = W/V_0$$

wherein
W is the theoretical weight, g;
$V_0$ is the macroscopic volume, mL.
$V_0$ is calculated by the following formula:

$$V_0\ (mL) = \pi D^2 h/4$$

wherein
D is the theoretical inside diameter, cm;
h is the height, cm.
Results of the bulk density are listed in Table 11.

TABLE 11

Bulk Density

| Sample | Strength (g) | Hydration Solution (Hydration Pressure 50 kPa) | Bulk Density (g/mL) |
|---|---|---|---|
| Active ingredient CPP (Currently marketed product) | NA | NA | 0.6246 |
| Hydrated CPP freeze-dried composition (Product according to the present invention) | 0.5 | 40% glycerol solution (w/w) | 0.0544 |
| | | Purified water | 0.0547 |
| | | 70% saturated sodium chloride solution | 0.0534 |
| | 1 | 40% glycerol solution (w/w) | 0.0516 |
| | 2 | 40% glycerol solution (w/w) | 0.0541 |

Example 12: Tapped Density (TD)

TD of the test sample is measured as per the Method I described in USP <616> which is obtained by mechanically tapping a graduated measuring cylinder (TAP Density Tester, Sotax TD2) containing the test sample.

Results of the tapped density are listed in the Table 12.

TABLE 12

Tapped Density

| Sample | Strength (g) | Hydration Solution (Hydration Pressure 50 kPa) | Tapped Density (g/mL) |
|---|---|---|---|
| Active ingredient CPP (Currently marketed product) | / | / | 0.9369 |
| Hydrated CPP freeze-dried composition (Product according to the present invention) | 0.5 | 40% glycerol solution (w/w) | 0.2160 |
| | | Purified water | 0.2313 |
| | | 70% saturated sodium chloride solution | 0.1903 |
| | 1 | 40% glycerol solution (w/w) | 0.2124 |
| | 2 | 40% glycerol solution (w/w) | 0.2573 |

Example 13: Skeletal Density (ρ1)

Skeletal Density, also known as true density, is determined at room temperature by Gas Pycnometer (Micromeritics Accupyc II 1340). Skeletal density is calculated by the following formula:

$$\rho_1\ (g/mL) = W/V_1$$

wherein
W is the weight of test sample (for example, active ingredient CPP, the hydrated CPP freeze-dried composition), g;
$V_1$ is the true volume of the test sample, measured by Gas Pycnometer, mL.

Results of the skeletal density are listed in Table 13.

TABLE 13

Skeletal Density

| Sample | Strength (g) | Hydration Solution (Hydration Pressure 50 kPa) | Skeletal Density (g/mL) |
|---|---|---|---|
| Active ingredient CPP (Currently marketed product) | / | / | 1.4286 |
| Hydrated CPP freeze-dried composition (Product according to the present invention) | 0.5 | 40% glycerol solution (w/w) | 1.6008 |
| | | Purified water | 1.4735 |
| | | 70% saturated sodium chloride solution | 1.4955 |
| | 1 | 40% glycerol solution (w/w) | 1.5334 |
| | 2 | 40% glycerol solution (w/w) | 1.5273 |

Example 14: Porosity

The porosity is calculated with the macroscopic volume ($V_0$) & true volume ($V_1$) or the bulk density ($\rho_0$) & skeletal density ($\rho_1$) by the following formula:

Porosity (%)=(1−$V_1/V_0$)×100%=(1−$\rho_0/\rho_1$)×100%

Results of the porosity are listed in Table 14.

TABLE 14

Porosity

| Sample | Strength (g) | Hydration Solution (Hydration Pressure 50 kPa) | Porosity (%) |
|---|---|---|---|
| Active ingredient CPP (Currently marketed product) | NA | NA | 56.28 |
| Hydrated CPP freeze-dried composition (Product according to the present invention) | 0.5 | 40% glycerol solution (w/w) | 96.60 |
| | | Purified water | 96.29 |
| | | 70% saturated sodium chloride solution | 96.43 |
| | 1 | 40% glycerol solution (w/w) | 96.63 |
| | 2 | 40% glycerol solution (w/w) | 96.46 |

Example 15: Powder X-Ray Diffraction (XRD)

An appropriate amount of test sample (for example, active ingredient CPP, mannitol, the hydrated CPP freeze-dried composition) was weighed respectively. The XRD patterns were recorded by Bruker's D8 Advance Diffractometer (Karlsruhe, West Germany) equipped with a 2θ compensating slit, using Cu Kα radiation (1.54 Å), at 40 kV and 40 mA passing through parabolic filter with divergence slit (0.5°), anti-scattering slit (0.5°) and receiving slit (1 mm). The diffractometer was calibrated for accuracy of peak positions with corundum. XRD patterns were obtained by scanning in continuous mode over an angular range of 6-36° 2θ with a step size of 0.020 and a dwell time of 1 s. Diffractograms were analyzed using MDI/JADE (version 6.0) diffraction software. The standard diffractograms of β- and δ-mannitol were generated using Mercury software using the cif files with reference codes DMANTL07 and DMANTL10, respectively. XRD patterns were shown in FIG. 1.

FIG. 1 showed overlaid XRD patterns obtained from CPP monohydrate, hydrated CPP freeze-dried compositions (initial ingredients include monohydrate CPP and δ-mannitol) and the two polymorphic forms of anhydrous mannitol. Hydrated CPP freeze-dried compositions showed characteristic peaks of δ-mannitol instead of β-mannitol (at 2θ values of 9.7° but no peak at 16.8°). Additionally, hydrated CPP freeze-dried compositions also exhibited characteristic peaks of CPP monohydrate (at 2θ values of 7.0°, 10.9°, 14.0°, and 17.8°).

It was reported that β-polymorph of mannitol is stable and δ-polymorph is metastable. Lyophilization of the solution containing only mannitol, yielded a mixture of β-(major) and δ-(minor) polymorphs of mannitol. However, in the presence of CPP in the mannitol solution, only δ-polymorph was observed in the lyophilized sample.

The crystalline form of hydrated freeze-dried cyclophosphamide composition that was hydrated by pure water according to the methods described in embodiments of the present invention may be characterized by an XRD pattern having characteristic peaks at 20.4°, 23.6°, 23.7°, and 25.2° of 2θ±0.2° 2θ. The crystalline form of hydrated freeze-dried cyclophosphamide composition that is hydrated by pure water according to the methods described in embodiments of the present invention may also or alternatively be characterized by an XRD pattern having characteristic peaks at 20.4°, 21.9°, 22.1°, 23.6°, 23.7°, 25.2°, and 25.4° of 2θ±0.2° 2θ.

In other embodiments, the crystalline form of hydrated freeze-dried cyclophosphamide composition that is hydrated by pure water according to the methods described in embodiments of the present invention may be characterized by a powder X-ray diffraction pattern substantially as shown in FIG. 2. The crystalline form of hydrated freeze-dried cyclophosphamide composition that is hydrated by pure water according to the methods described in embodiments of the present invention may also or alternatively be characterized by an XRD pattern having peaks substantially as provided in Table 15 (+0.2° 2θ) below.

TABLE 15

XRD of CPP Freezed-dried Compositions Hydrated by Pure Water

| Peak No. | Pos. [° 2 Th.] | d-spacing [Å] | Heights [cts] | $I/I_{max}$ [%] |
|---|---|---|---|---|
| 1 | 6.962 | 12.6856 | 15245 | 40.2 |
| 2 | 9.664 | 9.1447 | 22482 | 58.4 |
| 3 | 10.912 | 8.1012 | 3196 | 7.2 |
| 4 | 13.981 | 6.3289 | 18452 | 40.1 |
| 5 | 14.705 | 6.0189 | 18135 | 44 |
| 6 | 15.164 | 5.8381 | 2853 | 6.4 |
| 7 | 17.731 | 4.9982 | 22209 | 51.5 |
| 8 | 18.392 | 4.82 | 5754 | 13.7 |
| 9 | 18.814 | 4.7127 | 3326 | 7.9 |
| 10 | 19.416 | 4.5679 | 4882 | 10.5 |
| 11 | 19.772 | 4.4865 | 1741 | 5 |
| 12 | 20.377 | 4.3546 | 27144 | 73.3 |
| 13 | 20.658 | 4.2959 | 1155 | 8.1 |
| 14 | 20.778 | 4.2715 | 1253 | 10.3 |
| 15 | 21.059 | 4.215 | 5393 | 30.1 |
| 16 | 21.222 | 4.1831 | 8389 | 20.3 |
| 17 | 21.922 | 4.0512 | 12549 | 63.6 |
| 18 | 22.059 | 4.0262 | 9714 | 53.2 |
| 19 | 22.419 | 3.9624 | 2410 | 7.9 |
| 20 | 22.693 | 3.9151 | 413 | 0.9 |
| 21 | 22.854 | 3.888 | 259 | 0.5 |
| 22 | 23.568 | 3.7718 | 15411 | 82.6 |
| 23 | 23.686 | 3.7533 | 19968 | 100 |
| 24 | 24.63 | 3.6115 | 10522 | 31.8 |
| 25 | 25.211 | 3.5296 | 7407 | 79.1 |
| 26 | 25.35 | 3.5106 | 7955 | 63.1 |
| 27 | 26.053 | 3.4174 | 1904 | 4.3 |
| 28 | 26.735 | 3.3317 | 4891 | 15.3 |
| 29 | 27.916 | 3.1934 | 6067 | 23.9 |
| 30 | 28.197 | 3.1622 | 7861 | 25.2 |
| 31 | 28.899 | 3.087 | 3195 | 8.1 |
| 32 | 29.319 | 3.0437 | 467 | 1 |
| 33 | 29.703 | 3.0052 | 2412 | 11.2 |
| 34 | 30.206 | 2.9563 | 2354 | 7.2 |
| 35 | 31.585 | 2.8303 | 1268 | 4 |
| 36 | 32.13 | 2.7835 | 1135 | 4.4 |
| 37 | 32.613 | 2.7434 | 3076 | 10.9 |
| 38 | 33.614 | 2.664 | 4804 | 17.5 |
| 39 | 34.19 | 2.6204 | 1158 | 2.8 |
| 40 | 34.855 | 2.5719 | 5258 | 18 |

The crystalline form of hydrated freeze-dried cyclophosphamide composition that was hydrated by sodium chloride solution (70%) according to the methods described in embodiments of the present invention may be characterized by an XRD pattern having characteristic peaks at 20.4, 21.9°, 23.6°, and 23.7° of 2θ±0.2° 2θ. The crystalline form of hydrated freeze-dried cyclophosphamide composition that is hydrated by sodium chloride solution (70%) according to the methods described in embodiments of the present invention may also or alternatively be characterized by an XRD pattern having characteristic peaks at 20.4°, 21.9°, 22.1°, 23.6°, 23.7°, and 25.4° of 2θ±0.2° 2θ. In other embodiments, the crystalline form of hydrated freeze-dried cyclophosphamide composition that is hydrated by sodium chloride solution (70%) according to the methods described in embodiments of the present invention may be characterized by an XRD pattern substantially as shown in FIG. 3. The crystalline form of hydrated freeze-dried cyclophosphamide composition that is hydrated by sodium chloride solution according to the methods described in embodiments of the present invention may also or alternatively be characterized by an XRD pattern having peaks substantially as provided in Table 16 (±0.2° 2θ) below.

TABLE 16

XRD of CPP Freezed-dried Compositions Hydrated by Sodium Chloride Solution (70%)

| Peak No. | Pos. [° 2 Th.] | d-spacing [Å] | Heights [cts] | I/I$_{max}$ [%] |
|---|---|---|---|---|
| 1 | 7.00 | 12.6169 | 1815 | 38.3 |
| 2 | 9.69 | 9.1204 | 2030 | 43.3 |
| 3 | 10.964 | 8.0627 | 407 | 9 |
| 4 | 14.018 | 6.3124 | 2297 | 45.6 |
| 5 | 14.742 | 6.0042 | 2207 | 41.5 |
| 6 | 15.188 | 5.8288 | 345 | 5.3 |
| 7 | 17.767 | 4.988 | 3356 | 55.8 |
| 8 | 18.43 | 4.8101 | 828 | 15.2 |
| 9 | 18.851 | 4.7037 | 440 | 6.4 |
| 10 | 19.454 | 4.5591 | 512 | 9.3 |
| 11 | 19.78 | 4.4847 | 271 | 6.5 |
| 12 | 20.40 | 4.3499 | 3561 | 90.4 |
| 13 | 21.083 | 4.2105 | 781 | 43.1 |
| 14 | 21.259 | 4.1759 | 1285 | 32.9 |
| 15 | 21.944 | 4.0471 | 1611 | 67.5 |
| 16 | 22.081 | 4.0222 | 1238 | 50.4 |
| 17 | 22.44 | 3.9588 | 295 | 6.3 |
| 18 | 22.734 | 3.9082 | 90 | 0.5 |
| 19 | 23.589 | 3.7684 | 2133 | 51 |
| 20 | 23.723 | 3.7474 | 2643 | 100 |
| 21 | 24.667 | 3.6062 | 1354 | 38.8 |
| 22 | 25.37 | 3.5079 | 1049 | 41.7 |
| 23 | 26.075 | 3.4145 | 293 | 5.7 |
| 24 | 26.774 | 3.327 | 645 | 16.8 |
| 25 | 27.954 | 3.1891 | 835 | 29 |
| 26 | 28.235 | 3.158 | 1093 | 31.4 |
| 27 | 28.92 | 3.0848 | 506 | 10.2 |
| 28 | 29.741 | 3.0015 | 399 | 15.9 |
| 29 | 30.243 | 2.9528 | 379 | 11.6 |
| 30 | 31.605 | 2.8286 | 201 | 5.4 |
| 31 | 32.167 | 2.7804 | 185 | 9.6 |
| 32 | 32.667 | 2.739 | 341 | 12.2 |
| 33 | 33.635 | 2.6623 | 709 | 19.2 |
| 34 | 34.21 | 2.6189 | 237 | 4.2 |
| 35 | 34.876 | 2.5704 | 818 | 23.9 |
| 36 | 35.375 | 2.5353 | 373 | 11.5 |

The crystalline form of hydrated freeze-dried cyclophosphamide composition that is hydrated by glycerol solution (40%) according to the methods described in embodiments of the present invention may be characterized by an XRD pattern having characteristic peaks at 20.4°, 23.6°, 23.7°, and 25.2° of 2θ±0.2° 2θ. The crystalline form of hydrated freeze-dried cyclophosphamide composition that is hydrated by glycerol solution (40%) according to the methods described in embodiments of the present invention may also or alternatively be characterized by an XRD pattern having characteristic peaks at 20.4°, 21.9°, 22.1P, 23.6°, 23.7°, 25.2°, and 25.3° of 2θ±0.2° 2θ. In other embodiments, the crystalline form of hydrated freeze-dried cyclophosphamide composition that is hydrated by glycerol solution (40%) according to the methods described in embodiments of the present invention may be characterized by an XRD pattern substantially as shown in FIG. 4. The crystalline form of hydrated freeze-dried cyclophosphamide composition that is hydrated by glycerol solution according to the methods described in embodiments of the present invention may be characterized by an XRD pattern having peaks substantially as provided in Table 17 (±0.2° 2θ) below.

TABLE 17

XRD of CPP Freezed-dried Compositions Hydrated by Glycerol Solution (40%)

| Peak No. | Pos. [° 2 Th.] | d-spacing [Å] | Heights [cts] | I/I$_{max}$ [%] |
|---|---|---|---|---|
| 1 | 6.974 | 12.6645 | 7063 | 19.3 |
| 2 | 9.665 | 9.1436 | 8910 | 25.3 |
| 3 | 10.913 | 8.1005 | 1803 | 4.9 |
| 4 | 13.98 | 6.3293 | 10611 | 28.2 |
| 5 | 14.718 | 6.0137 | 11161 | 32.1 |
| 6 | 15.163 | 5.8383 | 1779 | 5.2 |
| 7 | 17.729 | 4.9986 | 16165 | 44.1 |
| 8 | 18.394 | 4.8194 | 4517 | 11.6 |
| 9 | 18.829 | 4.7091 | 2628 | 6.7 |
| 10 | 19.415 | 4.5682 | 2361 | 5 |
| 11 | 19.771 | 4.4868 | 1284 | 4.1 |
| 12 | 20.377 | 4.3546 | 20515 | 69.1 |
| 13 | 20.658 | 4.296 | 896 | 11.5 |
| 14 | 20.759 | 4.2754 | 864 | 10.6 |
| 15 | 21.06 | 4.2149 | 3913 | 28 |
| 16 | 21.222 | 4.1831 | 6521 | 18.8 |
| 17 | 21.92 | 4.0514 | 9697 | 55 |
| 18 | 22.059 | 4.0262 | 7103 | 44.6 |
| 19 | 22.404 | 3.9651 | 2062 | 7 |
| 20 | 22.705 | 3.9132 | 297 | 1.2 |
| 21 | 22.845 | 3.8895 | 239 | 1.2 |
| 22 | 23.567 | 3.7719 | 12766 | 64.2 |
| 23 | 23.685 | 3.7535 | 16436 | 100 |
| 24 | 24.63 | 3.6115 | 7630 | 28.1 |
| 25 | 25.212 | 3.5295 | 5312 | 68.1 |
| 26 | 25.349 | 3.5106 | 5758 | 57 |
| 27 | 26.055 | 3.4171 | 1388 | 3.9 |
| 28 | 26.736 | 3.3316 | 4332 | 14.9 |
| 29 | 27.915 | 3.1935 | 4843 | 20.1 |
| 30 | 28.197 | 3.1622 | 6263 | 23 |
| 31 | 28.883 | 3.0887 | 2410 | 6.6 |
| 32 | 29.722 | 3.0034 | 1943 | 11.4 |
| 33 | 29.884 | 2.9874 | 1113 | 10.9 |
| 34 | 30.222 | 2.9548 | 1893 | 6.6 |
| 35 | 31.571 | 2.8316 | 1177 | 3.4 |
| 36 | 32.13 | 2.7836 | 818 | 2.8 |
| 37 | 32.63 | 2.742 | 2519 | 9.7 |
| 38 | 33.613 | 2.664 | 3550 | 16 |
| 39 | 34.175 | 2.6215 | 966 | 2.5 |
| 40 | 34.857 | 2.5717 | 4566 | 17.9 |
| 41 | 35.353 | 2.5368 | 2095 | 9.7 |

Example 16: Redissolving Time 25 ml of 0.9% sodium chloride solution was added quickly into glass vial filled with test sample (hydrated CPP freeze-dried composition in 500 mg strength), or 100 ml of 0.9% sodium chloride injection was added quickly into glass vial filled with test sample (hydrated CPP freeze-dried composition in 2 g strength). Then the glass vial was placed on cyclotron (HY-5, Shanghai Suhao intelligent system Co. Ltd) making the glass vial oscillate at 250 rpm at room temperature to dissolve the active ingredient completely. The redissolving time was recorded in Table 18.

TABLE 18

Redissolving Time

| Sample | Strength (g) | Hydration Solution (Hydration Pressure 50 kPa) | Redissolving Time (min) |
|---|---|---|---|
| Active ingredient CPP (Currently marketed product) | 0.5 | NA | 8.7 |
| | 1 | NA | 11.2 |
| | 2 | NA | 16.4 |
| Hydrated CPP freeze-dried composition (Product according to the present invention) | 0.5 | 40% glycerol solution (w/w) | 1.5 |
| | | Purified water | 0.9 |
| | | 70% saturated sodium chloride solution | 1.0 |
| | 1 | 40% glycerol solution (w/w) | 1.2 |
| | 2 | 40% glycerol solution (w/w) | 2.5 |

Example 17: Particle Size Distribution (PSD)

The hydrated CPP freeze-dried composition was stirred by weighting scoop gently until flowable powder comes into being. Then 1-2 g test sample was added on injection plate. Test method and parameters were as follows:

| | |
|---|---|
| Instrument | OMEC Topsizer |
| Material | refractive index 1.5 |
| | absorption 0.1 |
| Model | Air Dispersion/Dry model |
| | Sensitivity enhanced |
| | Calculation model general |
| | particle shape irregular |
| Dispersion pressure | 400 kpa |
| Feed speed | 100% |
| Feed slit | 0.8 cm |
| Obscuration | 1-10 |
| Measuring time | 8 s |
| Background time | 8 s |
| Measure cycle | 3 |

It will be understood by a person of ordinary skill in the art that a common approach to defining the distribution width is to cite three values on the x-axis, the D10, D50, and D90. As used herein, the term ("D50" refers to the median particle diameter, wherein half of the particle population has a diameter below such value. As used herein, the teed "D90," refers to the particle diameter wherein 90% of the particle population has a diameter below such value. As used herein, the term "D10," refers to the particle diameter wherein 10% of the particle population has a diameter below such value. PSD results were listed in Table 19.

TABLE 19

Particle Size Distribution

| Sample | Hydration Solution (Hydration Pressure 50 kPa) | D10 (μm) | D50 (μm) | D90 (μm) |
|---|---|---|---|---|
| Hydrated freeze-dried composition (Product according to the present invention) | 40% glycerol solution | 3.5 | 10.9 | 35.8 |
| | purified water | 3.7 | 10.3 | 27.1 |
| | 70% saturation sodium chloride solution | 3.5 | 10.3 | 28.7 |
| Active ingredient CPP (Currently marketed product) | | 5.6 | 34.8 | 262.0 |

Example 18: In-Use Stability

Test samples (for example, active ingredient CPP, hydrated freeze-dried CPP composition) are reconstituted with 0.9% sodium chloride injection to 20 mg/ml. Then content and impurity profiles in Room Temperature (RT) and Refrigerator (2-8° C.) are determined respectively.

Impurity profiles test method is as follows:

| | | | |
|---|---|---|---|
| Column | YMC Pack Pro C18 250 × 4.6 mm, 5 μm or equivalent | | |
| Mobile phase A | pH = 7.0 10 mM $KH_2PO_4$ buffer | | |
| Mobile phase B | Mobile phase A/Acetonitrile = 20/80 | | |
| Flow | 1 ml/min | | |
| Gradient | Time | A | B |
| | 0 min | 100 | 0 |
| | 5 min | 100 | 0 |
| | 25 min | 70 | 30 |
| | 55 min | 40 | 60 |
| | 57 min | 100 | 0 |
| | 60 min | 100 | 0 |
| Injection volume | 100 μL | | |
| Sample tray Temperature | 2-8° C. | | |
| Column temperature | 25° C. | | |
| Detector | UV 200 nm | | |
| Standard solution | 0.2 mg/mL cyclophosphamide (anhydrous) water solution | | |
| Sample preparation | Dilute sample cake with 2-8° C. water to 20 mg/ml concentration, inject immediately. | | |

-continued

| Identified impurities | NA | Relative Retention Time | Relative Respone Fator |
|---|---|---|---|
| | USP related substance A | 0.17 | 1.2 |
| | USP related substance B | 0.25 | 0.9 |
| | USP related substance D | 0.85 | 2.9 |
| | CPP | 1.0 | 1.0 |

Content test method is as follows:

| | |
|---|---|
| Column | Waters μBondpak C18, 300 × 3.9 mm, 10 μm or equivalent |
| Mobile phase | Water:Acetonitrile = 70/30 (v/v) |
| Flow | 1.5 mL/min |
| Injection volume | 25 μL |
| Column temperature | 25° C. |
| Detector | UV 195 nm |
| Standard solution | 0.5 mg/mL cyclophosphamide (anhydrous) with 0.0185 mg/mL ethylparaben (internal standard) in water. Inject within 24 h. |
| Sample preparation | 0.5 mg/mL cyclophophamide with 0.0185 mg/mL ethylparaben (internal standard) in water, inject within 24 h |

In-use stability results were listed in Table 20.

TABLE 20

| | | \multicolumn{6}{c}{In-use Stability} | | | | | |
|---|---|---|---|---|---|---|---|

| Sample | | 0 h (initial) | 6 h (RT) | 12 h (RT) | 24 h (RT) | 3 Days (2-8° C.) | 6 Days (2-8° C.) |
|---|---|---|---|---|---|---|---|
| Active ingredient CPP (Currently marketed product) | Impurity B | 0.03 | 0.71 | 1.01 | 1.82 | 0.45 | 0.64 |
| | Impurity D | 0.00 | 0.00 | 0.05 | 0.30 | 0.00 | 0.00 |
| | Impurity A | 0.03 | 0.00 | 0.00 | 0.03 | 0.00 | 0.00 |
| | Individual unknown impurity | 0.08 | 0.06 | 0.14 | 0.47 | 0.09 | 0.12 |
| | Total impurities | 0.15 | 0.81 | 1.33 | 2.64 | 0.57 | 0.77 |
| | Content | / | 95.3% | 96.7% | 97.0% | 96.7% | 95.2% |
| Hydrated freeze-dried composition (40% glycerol solution (w/w), hydration pressure 50 kPa) | Impurity B | 0.10 | 0.69 | 1.18 | 1.91 | 0.81 | 1.22 |
| | Impurity D | 0.63 | 0.56 | 0.66 | 0.96 | 0.61 | 0.73 |
| | Impurity A | 0.04 | 0.04 | 0.04 | 0.08 | 0.04 | 0.07 |
| | Individual unknown impurity | 0.05 | 0.07 | 0.21 | 0.54 | 0.28 | 0.49 |
| | Total impurities | 0.87 | 1.43 | 2.20 | 3.57 | 1.88 | 2.64 |
| | Content | 100.1% | 100.3% | 99.8% | 99.8% | 96.7% | 102.6% |

Example 19: Stability

Test samples (for example, active ingredient CPP, hydrated freeze-dried CPP composition) were placed in 45° C. oven, sampled after 1 week and 2 weeks, respectively and determined the CPP contents. Stability results were shown in Table 21.

TABLE 21

| Sample | Stability Condition | | | | | | | |
|---|---|---|---|---|---|---|---|---|
| | 45° C. -1 Week | | | | 45° C. -2 Weeks | | | |
| | Active ingredient CPP (Currently marketed product) | Hydrated CPP freeze-dried composition (Product according to the present invention) | | | Active ingredient CPP (Currently marketed product) | Hydrated CPP freeze-dried composition (Product according to the present invention) | | |
| Hydration solution (Hydration pressure 50 kPa) | NA | 40% glycerol solution (w/w) | Purified Water | 70% saturation sodium chloride solution | NA | 40% glycerol solution (w/w) | Purified Water | 70% saturation sodium chloride solution |
| Impurity B (%) | 0.61 | 0.02 | 0.02 | 0.02 | 1.40 | 0.05 | 0.07 | 0.03 |
| Impurity D (%) | 0.71 | 0.74 | 0.80 | 0.83 | 0.98 | 0.84 | 0.93 | 0.74 |
| Impurity A (%) | 0.65 | 0.06 | 0.05 | 0.07 | 1.82 | 0.09 | 0.07 | 0.07 |
| Max. individual unknown impurity (%) | 2.01 | 0.11 | 0.11 | 0.16 | 1.56 | 0.19 | 0.05 | 0.13 |
| Total impurities (%) | 5.66 | 1.09 | 1.10 | 1.26 | 15.59 | 1.22 | 1.17 | 1.07 |
| Content (%) | 82.6 | 102.3 | 100.2 | 102.3 | 45.8 | 82.0 | 82.1 | 81.2 |
| Appearance | Liquefied and sticky material | Uniform cake | Collapsed cake | Uniform cake | Liquefied and sticky material | Uniform cake | Serious collapsed cake | Uniform cake |

It can be seen from the results of Examples 18 and 19 that the hydrated CPP freeze-dried composition according to the invention shows excellent stability.

Example 20: Residual Glycerol Test

In this Example, the residual glycerol content of the CPP freeze-dried composition (500 mg, active ingredient CPP from Haizheng, Hetero or Guike) according to the invention was tested. CPP freeze-dried composition is obtained by hydrating with 40% glycerol solution, purified water and 70% saturation sodium chloride solution, respectively.

Residual glycerol test method is as follows:

| | |
|---|---|
| Chromatographic column | Welch ultimate XB-NH2 4.6 * 150 mm, 5 μm or equivalent |
| Mobile phase | Acetonitrile/Water = 70/30 |
| Flow rate | 1 mL/min |
| Column temperature | 30° C. |
| Injection volume | 25 μL |
| Standard solution | 0.1 mg/mL glycerol solution |
| Sample preparation | Preparing the sample into 100 mg/mL solution with water, shaking for 30 s, filtering with 0.45 μm PTFE membrane, discarding the first three drops, for use |

Results of residual glycerol test were listed in Table 22. It can be seen from these results that the hydrated CPP freeze-dried composition according to the invention was free of glycerol.

TABLE 22

Residual Glycerol Test

| Hydrated solution | CPP source | Results |
|---|---|---|
| 40% glycerol solution | Haizheng | ND (<0.1%) |
| 70% saturation sodium chloride solution | Hetero | ND (<0.1%) |
| Purified water | Guike | ND (<0.1%) |

ND: not detected

As can be seen from the above results, the hydrated CPP freezed-dried composition according to the invention is free of glycerol, which satisfies the requirements to injectable formulation for use.

Although typical embodiments according to the invention have been described, the invention should not be limited the detailed description. Due to various amendments and changes without departing the spirit of the invention, a person skilled in the art would come to variations and equivalences through conventional experiments and the variations and equivalences fall within the spirit and scope as defined by the appended claims.

The invention claimed is:

1. An injectable composition, comprising cyclophosphamide and mannitol,
   wherein the porosity of the composition is greater than 96%, and
   the composition has a moisture content of 7.8% to about 9.0%, based on cyclophosphamide monohydrate.

2. A method for making the injectable composition of claim 1, comprising:
   (a) providing an aqueous solution comprising cyclophosphamide and mannitol;

(b) freeze-drying the aqueous solution to give a solid composition; and (c) hydrating the solid composition with vapor phase moisture from liquid water to give the injectable composition.

3. The method according to claim 2, wherein the liquid water is a water solution.

4. The method according to claim 3, wherein the water solution comprises a strong acid, a strong alkali, an inorganic salt, a glycerol, a pharmaceutically acceptable excipient or inorganic salt.

5. The method according to claim 4, wherein the water solution provides a relative humidity during (c) of about 60% to about 98%.

6. The method according to claim 2, wherein the hydrating is performed under a micro negative pressure of about 10-90 kPa.

7. The method of claim 4, wherein the relative humidity during (c) is about 70% to about 95%.

8. The injectable composition of claim 1,
wherein the particle size distribution of the composition is characterized by a D50 value of less than 11.0 μm,
the bulk density of the composition is less than about 0.0600 g/mL, and
at least about 99% of the cyclophosphamide is retained after 3 weeks at 45° C.

9. The injectable composition of claim 8, wherein a redissolving time of 500 mg of the composition in 25 ml of a 0.9% NaCl aqueous solution with cyclotron mixing in a glass vial oscillate at 250 rpm at room temperature is less than 2 minutes.

10. The injectable composition of claim 8, wherein the tapped density of the composition is less than about 0.3000 g/mL.

11. The injectable composition of claim 8, wherein the skeletal density of the composition is greater than 1.4700 g/mL.

12. The injectable composition of claim 8, wherein the particle size distribution of the composition is characterized by a D90 value of less than 36.0 μm.

13. The injectable composition of claim 12, wherein the particle size distribution of the composition is characterized by a D90 value of less than 29.0 μm.

14. The injectable composition of claim 8, wherein the mannitol comprises δ-mannitol.

15. The injectable composition of claim 14, wherein the mannitol consists of δ-mannitol.

16. The injectable composition of claim 8, wherein the composition comprises less than 0.1% cyclophosphamide impurity B, as measured by HPLC, after the composition is maintained at a temperature of about 45° C. for up to 7 days.

17. The injectable composition of claim 8, wherein the composition comprises less than 0.1% cyclophosphamide impurity A, as measured by HPLC, after the composition was maintained at a temperature of about 45° C. for up to 7 days.

18. The injectable composition of claim 1, wherein the composition has a moisture content of 8.0% to about 9.0%, based on cyclophosphamide monohydrate.

* * * * *